United States Patent
Perez-Pena

(10) Patent No.: US 8,551,241 B2
(45) Date of Patent: Oct. 8, 2013

(54) FLY ASH BASED LIGHTWEIGHT CEMENTITIOUS COMPOSITION WITH HIGH COMPRESSIVE STRENGTH AND FAST SET

(71) Applicant: United States Gypsum Company, Chicago, IL (US)

(72) Inventor: Marianela Perez-Pena, Grayslake, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 13/755,371

(22) Filed: Jan. 31, 2013

(65) Prior Publication Data
US 2013/0139728 A1    Jun. 6, 2013

Related U.S. Application Data

(62) Division of application No. 12/237,634, filed on Sep. 25, 2008, now Pat. No. 8,366,823.

(51) Int. Cl.
*C04B 11/00*    (2006.01)

(52) U.S. Cl.
USPC ........... 106/705; 106/724; 106/728; 106/737; 106/DIG. 1

(58) Field of Classification Search
USPC ..................... 106/705, 724, 728, 737, DIG. 1
See application file for complete search history.

(56) References Cited

U.S. PATENT DOCUMENTS

| | | |
|---|---|---|
| 4,488,909 A | 12/1984 | Galer et al. |
| 4,494,990 A | 1/1985 | Harris |
| 4,661,159 A | 4/1987 | Ortega et al. |
| 4,997,484 A | 3/1991 | Gravitt et al. |
| 5,114,487 A | 5/1992 | Gartshore et al. |
| 5,374,308 A | 12/1994 | Kirkpatrick et al. |
| 5,387,283 A | 2/1995 | Kirkpatrick et al. |
| 5,489,334 A | 2/1996 | Kirkpatrick et al. |
| 5,490,889 A | 2/1996 | Kirkpatrick et al. |
| 5,536,310 A | 7/1996 | Brook et al. |
| 5,536,458 A | 7/1996 | Kawakita et al. |
| 5,643,510 A | 7/1997 | Sucech |
| 5,714,002 A | 2/1998 | Styron |
| 5,714,003 A | 2/1998 | Styron |
| 5,997,632 A | 12/1999 | Styron |
| 6,482,258 B2 | 11/2002 | Styron |
| 6,554,894 B2 | 4/2003 | Styron et al. |
| 6,641,658 B1 | 11/2003 | Dubey |
| 6,827,776 B1 | 12/2004 | Boggs et al. |
| 6,869,474 B2 | 3/2005 | Perez-Pena et al. |
| 7,288,148 B2 | 10/2007 | Hicks et al. |
| 7,651,564 B2 | 1/2010 | Francis |
| 7,670,427 B2 | 3/2010 | Perez-Pena et al. |
| 7,892,351 B1 | 2/2011 | Kirkpatrick et al. |
| 8,016,937 B2 | 9/2011 | Schumacher et al. |

(Continued)

FOREIGN PATENT DOCUMENTS

EP    0 439 372 A2    7/1991
KR    10-2004-0102937    12/2004

(Continued)

*Primary Examiner* — Paul Marcantoni
(74) *Attorney, Agent, or Firm* — Novak Druice Connolly Bove + Quigg LLP; Pradip Sahu; Philip T. Petti

(57) ABSTRACT

A method of making a rapid setting lightweight cementitious composition with improved compressive strength for products such as boards is disclosed. The method mixes fly ash, alkali metal salt of citric acid and lightweight aggregate with water. Compositions which include fly ash, alkali metal salts of citric acid and lightweight aggregate are also disclosed.

20 Claims, 9 Drawing Sheets

(56) References Cited

U.S. PATENT DOCUMENTS

| | | |
|---|---|---|
| 2007/0079733 A1 | 4/2007 | Crocker |
| 2008/0178770 A1 | 7/2008 | Schumacher et al. |

FOREIGN PATENT DOCUMENTS

| | | |
|---|---|---|
| KR | 10-0528024 | 11/2005 |
| NZ | 227101 A | 8/1991 |
| WO | 8905284 A1 | 6/1989 |
| WO | 2004/005212 A2 | 1/2004 |

FLY ASH BASED LIGHTWEIGHT CEMENTITIOUS COMPOSITION WITH HIGH COMPRESSIVE STRENGTH AND FAST SET

CROSS REFERENCE TO RELATED APPLICATIONS

This is a divisional of U.S. patent application Ser. No. 12/237,634, filed Sep. 25, 2008, incorporated herein by reference.

FIELD OF THE INVENTION

This invention relates generally to fast setting cementitious compositions that can be used for a variety of applications in which rapid hardening and attainment of early strength is desirable. In particular, the invention relates to cementitious compositions that can be used to make boards with excellent moisture durability for use in wet and dry locations in buildings. Precast concrete products such as cement boards are made under conditions which provide a rapid setting of the cementitious mixture so that the boards can be handled soon after the cementitious mixture is poured into a stationary or moving form or over a continuously moving belt. Ideally, this setting of the cement mixture may be achieved as soon as about 20 minutes, preferably as soon as 10 to 13 minutes, more preferably as soon as 4 to 6 minutes, after mixing the cement mixture with a suitable amount of water.

BACKGROUND OF THE INVENTION

U.S. Pat. No. 6,869,474 to Perez-Pena et al, incorporated herein by reference, discusses extremely fast setting of cementitious compositions for producing cement-based products such as cement boards achieved by adding an alkanolamine to hydraulic cement such as portland cement, and forming a slurry with water under conditions that provide an initial slurry temperature of at least 90° F. (32° C.). Additional reactive materials may be included such as high alumina cement, calcium sulfate and a pozzolanic material such as fly ash. The extremely rapid set permits rapid production of cementitious products. Triethanolamine additions have been found to be a very powerful accelerator capable of producing formulations with relatively short final setting times with increased levels of fly ash and gypsum and without the need of calcium aluminate cements. However, formulations with triethanolamine also had relatively lower early-age compressive strength compared to cement board formulations containing the calcium aluminate cements.

Pending U.S. patent application Ser. No. 11/758,947 filed Jun. 6, 2007 of Perez-Pena et al, incorporated herein by reference, discusses extremely fast setting of cementitious compositions with early-age compressive strength for producing cement-based products such as cement boards achieved by adding an alkanolamine and a phosphate to a hydraulic cement such as portland cement, and forming a slurry with water under conditions that provide an initial slurry temperature of at least 90° F. (32° C.). Additional reactive materials may be included such as high alumina cement, calcium sulfate and a pozzolanic material such as fly ash. Again, all of the compositions contained a significant amount of hydraulic cement and gypsum.

U.S. Pat. No. 4,488,909 to Galer et al, incorporated herein by reference, discusses cementitious compositions capable of rapid setting. The compositions permit high speed production of carbon dioxide resistant cement boards by forming essentially all of the potential ettringite within about 20 minutes after the composition is mixed with water. The essential components of the cementitious composition are portland cement, high alumina cement, calcium sulfate and lime. Pozzolans such as fly ash, montmorillonite clay, diatomaceous earth and pumicite may be added up to about 25%. The cement composition includes about 14 to 21 wt % high alumina cement, which in combination with the other components makes possible the early formation of ettringite and other calcium aluminate hydrates responsible for early setting of the cementitious mixture. In their invention, Galer et al provided aluminates using high alumina cement (HAC) and sulfate ions using gypsum to form ettringite and achieve rapid setting of their cementitious mixture.

Ettringite is a calcium aluminum sulfate compound having the formula $Ca_6Al_2(SO_4)_3 \cdot 32H_2O$ or alternatively $3CaO \cdot Al_2O_3 \cdot 3CaSO_4 \cdot 32H_2O$. Ettringite forms as long needle-like crystals and provides rapid early strength to cement boards, so that they can be handled soon after being poured into a mold or over a continuous casting and forming belt.

In general, Galer et al's rapid setting formulation suffers from several limitations. These limitations, as highlighted below, are even more of a concern for the production of cementitious products such as cement boards.

U.S. Pat. No. 5,536,310 to Brook et al disclose a cementitious composition containing 10-30 parts by weight (pbw) of a hydraulic cement such as portland cement, 50-80 pbw fly ash, and 0.5-8.0 pbw expressed as a free acid of a carboxylic acid such as citric acid or alkali metal salts thereof, e.g., tripotassium citrate or trisodium citrate, with other conventional additives, including retarder additives such as boric acid or borax, which are used to accelerate the reaction and setting time of the composition to overcome the disclosed disadvantageous of using a high fly ash content in cement compositions.

U.S. Pat. No. 5,536,458 to Brook et al disclose a cementitious composition containing a hydraulic cement such as portland cement, 70-80 parts by weight fly ash, and 0.5-8.0 pbw of a free carboxylic acid such as citric acid or an alkali metal salts thereof e.g. potassium citrate or sodium citrate, with other conventional additives including retarder additives such as boric acid or borax, which are used to accelerate the reaction and setting time of the composition to overcome the known disadvantageous of using a high fly ash content in cement compositions.

U.S. Pat. No. 4,494,990 to Harris discloses a cementitious mixture of portland cement e.g. 25-60 pbw, fly ash e.g. 3-50 pbw and less than 1 pbw of sodium citrate.

U.S. Pat. No. 6,827,776 to Boggs et al disclose a hydraulic cement composition comprising portland cement, fly ash, which has a setting time controlled by pH of an activator slurry of an acid, preferably citric acid, and a base which can be an alkali or alkaline earth metal hydroxide or salt of the acid component.

U.S. Pat. No. 5,490,889 to Kirkpatrick et al disclose a blended hydraulic cement consisting of water, fly ash (50.33-83.63 pbw), portland cement, ground silica, boric acid, borax, citric acid (0.04-2.85 pbw) and an alkali metal activator, e.g. lithium hydroxide (LiOH) or potassium hydroxide.

U.S. Pat. No. 5,997,632 to Styron discloses a hydraulic cement composition containing 88-98 wt. % fly ash, 1-10 wt. % portland cement and from about 0.1-4.0 wt. % citric acid. Lime to achieve a desirable minimum lime content of 21% is provided by the subbituminous fly ash or the sub-bituminous fly ash in combination with a beneficiating agent. In addition to citric acid Styron uses an alkali source such as potassium or sodium hydroxide.

The final setting times of the cementitious mixtures of prior art products are typically greater than 9 minutes and can extend to 2-3 hours for standard concrete products. The final setting time is normally defined as the time in which the cementitious mixtures set to the extent that the concrete products made thereof can be handled and stacked, although chemical reactions may continue for extended periods.

The amount of high alumina cement (also known as calcium aluminate cement) in the reactive powder blend in prior art concrete products is also very high. Typically, the high alumina cement is greater than 14 wt % of the reactive powder blend.

SUMMARY OF THE INVENTION

It is an object of the present invention to provide a method of making fast setting cementitious slurry.

It is another object of the present invention to provide a lightweight cementitious compositions with enhanced early and final compressive strength. The cementitious compositions contain potassium citrate, sodium citrates or mixtures thereof.

The present invention includes a method of providing a lightweight cementitious mixture having rapid set, improved compressive strength and water durability comprising: mixing at ambient or above ambient temperatures, water, reactive powder, a set accelerating amount of alkali metal salt of citric acid, and lightweight aggregate wherein the ratio of water to reactive powder solids is about 0.17 to 0.35:1.0 and more preferably about 0.20 to 0.23:1.0, the reactive powder comprising 75 to 100 wt. % fly ash, and 0 to 25 wt. % hydraulic cement and gypsum.

Preferably the reactive powder has no hydraulic cement and no gypsum (hydrated calcium sulfate).

This cementitious reactive powder includes at least fly ash and also may include hydraulic cement, for example, portland cement or calcium aluminate cement (CAC) (also commonly referred to as aluminous cement or high alumina cement), calcium sulfate, and a non-fly ash mineral additive.

Up to 25 wt % of the cementitious reactive powder blend of the cementitious composition may be non-fly ash mineral additives possessing substantial, little, or no cementing properties.

The cementitious reactive powder generally contains about 10 to 40 wt. % lime and more typically 20 to 30 wt % lime. However, addition of lime is not required to obtain rapid set if the ingredients of the reactive powder already contain enough lime. For example, Type C fly ash generally contains lime. Thus, the reactive powder blend of the cementitious composition is typically free of externally added lime.

Typically the slurry has an initial temperature of from room temperature to about 100° F.-115° F. (24° C. to about 38°-46° C.).

The final setting time (i.e., the time after which cementitious boards can be handled) of the cementitious composition as measured according to the Gilmore needle should be at most 20 minutes, preferably 10 to 13 minutes or less, more preferably about 4 to 6 minutes after being mixed with a suitable amount of water. A shorter setting time and higher early age compressive strength helps to increase the production output and lower the product manufacturing cost.

The very fast setting cementitious compositions of this invention can be used for a variety of applications in which rapid hardening and attainment of early strength is desirable. Using the alkali metal salt of citric acid, such as potassium citrate and/or sodium citrate, to accelerate setting of the cementitious composition, when the slurry is formed at elevated temperatures, makes possible increased rate of production of cementitious products such as cement boards.

The dosage of alkali metal citrate in the slurry is preferably in the range of about 1.5 to 6 wt. %, preferably about 1.5 to 4.0 wt. %, more preferably about 2 to 3.5 wt. %, and most preferably about 3.5 wt. % based on the cementitious reactive components of the invention. Potassium citrates or sodium citrates are preferred. As mentioned above, these weight percents are based on 100 parts by weight of the reactive components (cementitious reactive powder). Thus for example, for 100 pounds of cementitious reactive powder, there may be about 1.5 to 4.0 total pounds of potassium and/or sodium citrates.

A typical cementitious reactive powder of this invention comprises 75 to 100 wt % fly ash and 0 to 25 wt. % hydraulic cement, such as portland cement, or gypsum. Typically at least half of the fly ash is Type C fly ash.

Another typical cementitious reactive powder includes 75 to 100 wt % fly ash, zero to 20 wt % calcium aluminate cement, zero to 7 wt % calcium sulfate based on the weight of the reactive powder, no gypsum and no hydraulic cement other than calcium aluminate cement.

There is a synergistic interaction between the alkali metal citrate and the fly ash. Adding the alkali metal salt has the benefits of achieving increasing early and long term compressive strength for compositions containing high amounts of fly ash compared with comparable compositions using accelerators like calcium aluminate cements, triethanolamine or the corrosive alkali metal hydroxides.

In addition, adding the alkali metal citrates improves mix fluidity contrary to other accelerators such as aluminum sulfate which may lead to premature stiffening of concrete mixtures.

Other additives, e.g., inert aggregate, may also be present, which are not considered cementitious reactive powder, but are part of the overall cementitious composition. Such other additives include one or more of sand, aggregate, lightweight fillers, water reducing agents such as superplasticizers, set accelerating agents, set retarding agents, air-entraining agents, foaming agents, shrinkage control agents, slurry viscosity modifying agents (thickeners), coloring agents and internal curing agents, may be included as desired depending upon the process ability and application of the cementitious composition of the invention.

The lightweight cementitious compositions of the present invention can be used to make precast concrete building products such as cementitious boards with excellent moisture durability for use in wet and dry locations in buildings. The precast concrete products such as cement boards are made under conditions which provide a rapid setting of the cementitious mixture so that the boards can be handled soon after the cementitious mixture is poured into a stationary or moving form or over a continuously moving belt.

The lightweight cementitious compositions can be used in any concrete product application including concrete panels, flooring, overlays, finishes, capping, as well as patching mixes for concrete roads. The concrete products made with the lightweight compositions of this invention have particular advantages for use which require water durability compared to compositions which contain gypsum and applications which require higher compressive strength than cement containing compositions which have a higher carbon foot print.

All percentages, ratios and proportions herein are by weight, unless otherwise specified.

DETAILED DESCRIPTION OF THE INVENTION

Figure 1:
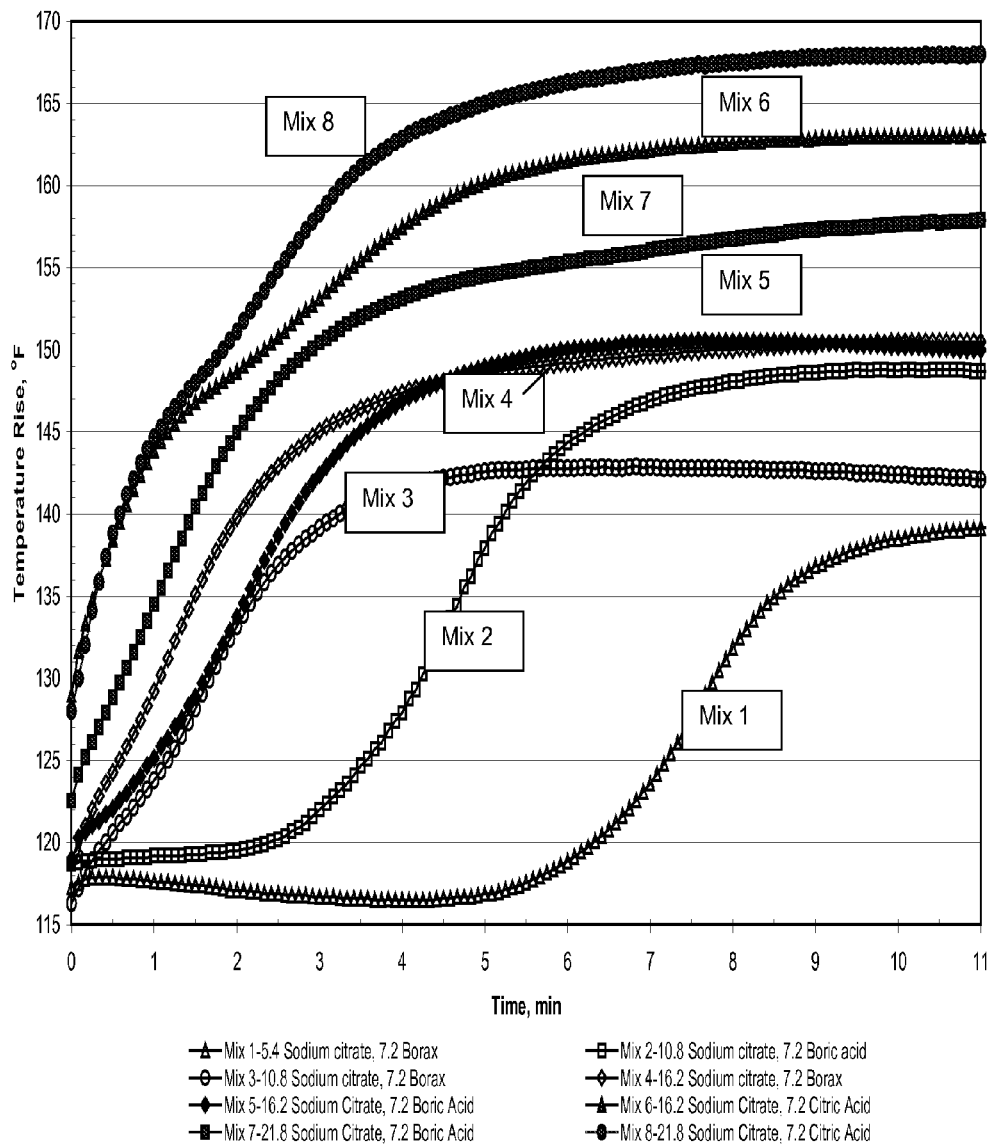
FIG. 1 is a graph of the results of Example 1 showing the effect of increasing sodium citrates on the rate of temperature rise for mixes with borax, boric acid and citric acid.

The present invention includes a method of providing a lightweight cementitious mixture having improved compressive strength and water durability comprising: mixing water, reactive powder, an alkali metal salt of citric acid, and lightweight aggregate wherein the ratio of water to reactive powder solids is about 0.17 to 0.35:1.0, typically about 0.17 to 0.30:1.0, more preferably about 0.2 to 0.23:1.0. The reactive powder comprises 75 to 100 wt. % fly ash and 0 to 25 wt. % hydraulic cement and/or or gypsum. Typically the present invention mixes the cementitious reactive powder including fly ash with potassium citrates and/or sodium citrates and water at an initial slurry temperature of at least room temperature to 115° F. (24° C. to 41° C.) to yield a rapid set of preferably less than 10 to 13 minutes, more preferably about 4 to 6 minutes or less.

The present invention also provides cementitious compositions with enhanced rapid final setting performance and enhanced early compressive strength.

The typical ingredients are listed in the following TABLE A.

TABLE A

| Ingredient | Broad parts by weight dry basis per 100 parts reactive powder | Preferred parts by weight dry basis per 100 parts reactive powder | More preferred parts by weight dry basis per 100 parts reactive powder |
|---|---|---|---|
| Reactive Powder | 100 parts | 100 parts | 100 parts |
| Fly Ash | 75 to 100 | 88.5 to 100 | |
| Portland Cement | less than 5 | about 0 | |
| Calcium aluminate cement | less than 5 | about 0 | |
| Calcium sulfate other than gypsum** | less than 2 | about 0 | |
| Gypsum | less than 2 | about 0 | |
| non-fly ash mineral additive | less than 25 | less than 25 | |
| added lime | optional* | none | |
| alkali metal salt of citric acid | 1.5 to 6 | 1.5 to 4 | 2 to 3.5 |
| lightweight aggregate | 1-200 | 2-125 | |
| non-fly-ash mineral additive set retarder | less than 25 | less than 11.5 | |
| air-entraining agent | 0.01 to 1 | | |
| secondary inorganic set accelerator | less than 1 | less than 0.25 | less than 0.1 |
| superplasticizer | 2 max. | 0.1 to 1 | |
| shrinkage control agents, coloring agents, viscosity modifying agents (thickeners) and internal curing agents | 1 max | — | |

*added lime not needed if reactive powder ingredients already contain sufficient lime.
**Calcium sulfate is at least one of calcium sulfate anhydride and calcium sulfate hemihydride. Gypsum is also known as calcium sulfate dihydrate.

Generally the weight ratio of water to cementitious reactive powder is about 0.15-0.3:1.0. Inert lightweight aggregates are not part of the cementitious reactive powder.

While not wishing to be limited to a particular theory, it is theorized that increased early age and compressive strength are achieved with rapid sets by providing the cementitious reactive powder, with high fly ash mineral content of 75 to 100 wt % and preferably no portland cement or calcium aluminate cement or gypsum, and mixing the cementitious reactive powder, alkali metal citrate and water to form slurry at elevated temperatures above 20° C. so that formation of alkali alumino silicate hydrates and/or hydrates of alumino silicate and/or calcium alumino silicate compounds present in the fly ash can take place as a result of the hydration of this reactive powder blend with the alkali metal citrate.

Thus, a suitable amount of water is provided to hydrate the cementitious reactive powder and to rapidly form alkali alumino silicate hydrates and other hydrates present in the fly ash. Generally, the amount of water added will be greater than theoretically required for the hydration of the cementitious reactive powder. This increased water content facilitates the workability of the cementitious slurry. Typically, in the slurry the weight ratio of the water to reactive powder blend is about 0.20 to 0.35:1, more typically about 0.20 to 0.30:1, preferably about 0.20 to 0.23:1. The amount of water depends on the needs of the individual materials present in the cementitious composition.

The alkali alumino silicate hydrates and/or other hydrates of alumino silicate and/or calcium alumino silicate compounds form very rapidly in the hydration process thus imparting rapid set and rigidity to the mixtures made with the cementitious reactive powder blend of the cementitious composition of the invention. In manufacturing of cement-based products such as cement boards, it is primarily the formation of alkali alumino silicate hydrates and/or other hydrates of alumino silicate and/or calcium alumino silicate compounds that makes possible handling of cement boards within a few minutes after the cementitious composition of the invention is mixed with a suitable amount of water.

Setting of the composition is characterized by initial and final set times, as measured using Gilmore needles specified in the ASTM C266 test procedure. The final set time also corresponds to the time when a concrete product, e.g., a concrete panel, has sufficiently hardened so that it can be handled or trafficked, in the case of a concrete floor or road. Relatively higher early age (3 to 5 hours) compressive strength can be an advantage for concrete material because it can withstand higher stresses without deformation. It will be understood by those skilled in the art that curing reactions continue for extended periods after the final setting time has been reached.

Early age strength of the composition is characterized by measuring the compressive strength after 3 to 5 hours of curing as specified in the ASTM C109. Achieving high early strength allows for ease of handling the stacked panels.

Cementitious Reactive Powder

The cementitious reactive powder contains fly ash and optionally non-fly ash mineral additives, hydraulic cement and optionally gypsum. The cementitious reactive powder typically contains 75 to 100% fly ash and 0 to 25 wt. % of a member selected from the group consisting of hydraulic cement, gypsum and non-fly ash Mineral Additives. The cementitious reactive powder preferably contains 88.5-100 wt % fly ash. The cementitious reactive powder more preferably contains 88.5-100 wt % fly ash and no hydraulic cement and no gypsum.

Preferably the cementitious reactive powder contains 10 to 40 wt. % lime. However, this lime is generally not added lime. Rather it is included in another ingredient of the cementitious reactive powder, for example, the fly ash.

The principal ingredient of the cementitious reactive powder of the cementitious composition of the invention is a fly ash mineral additive, preferably Type C fly ash. Fly ash is described below in the section entitled Fly ash and Non-Fly ash Mineral Additives.

In addition to fly ash, the cementitious reactive powder may include 0 to 25 wt. % of optional cementitious additives such as portland cement, calcium aluminate cement, calcium sulfate or gypsum (landplaster). However, the lower water content cementitious compositions of the invention, i.e. cementitious compositions with a water to reactive powder weight ratio of about 0.17 to 0.35:1.0, with these optional cementitious additives have a significantly reduced compressive strength compared to the same lower water content compositions of the invention without the additional cementitious additives.

For example, in some cementitious reactive powder blends when compressive strength is not required or when higher water to reactive powder ratios are to be used e.g. at ratios above about 0.35:1.0, portland cement can be used at about 0 to 25 wt % and fly ash 75 to 100 wt %.

Fly Ash and Non-Fly Ash Mineral Additives

The hydraulic cement of traditional reactive powder compositions is substantially replaced by fly ash having pozzolanic properties, particularly Class C fly ash, together with other optional non-fly ash mineral additives possessing substantial, little, or no cementing properties. Non-fly ash mineral additives having pozzolanic properties are particularly preferred in the cementitious reactive powder of the invention.

ASTM C618-97 defines pozzolanic materials as "siliceous or siliceous and aluminous materials which in themselves possess little or no cementitious value, but will, in finely divided form and in the presence of moisture, chemically react with calcium hydroxide at ordinary temperatures to form compounds possessing cementitious properties." Various natural and man-made materials have been referred to as pozzolanic materials possessing pozzolanic properties. Some examples of pozzolanic materials include pumice, perlite, diatomaceous earth, silica fume, tuff, trass, rice husk, metakaolin, ground granulated blast furnace slag, and fly ash.

All of these pozzolanic materials can be used either singly or in combined form as part of the cementitious reactive powder of the invention.

Fly ash is the preferred pozzolan in the cementitious reactive powder blend of the invention. Fly ashes containing high calcium oxide and calcium aluminate content (such as Class C fly ashes of ASTM C618 standard) are preferred as explained below. Other mineral additives such as calcium carbonate, vermiculite, clays, and crushed mica may also be included as mineral additives.

Fly ash is a fine powder byproduct formed from the combustion of coal. Electric power plant utility boilers burning pulverized coal produce most commercially available fly ashes. These fly ashes consist mainly of glassy spherical particles as well as residues of hematite and magnetite, char, and some crystalline phases formed during cooling. The structure, composition and properties of fly ash particles depend upon the structure and composition of the coal and the combustion processes by which fly ash is formed. ASTM C618 standard recognizes two major classes of fly ashes for use in concrete—Class C and Class F. These two classes of fly ashes are generally derived from different kinds of coals that are a result of differences in the coal formation processes occurring over geological time periods. Class F fly ash is normally produced from burning anthracite or bituminous coal, whereas Class C fly ash is normally produced from lignite or sub-bituminous coal.

The ASTM C618 standard differentiates Class F and Class C fly ashes primarily according to their pozzolanic properties. Accordingly, in the ASTM C618 standard, the major specification difference between the Class F fly ash and Class C fly ash is the minimum limit of $SiO_2+Al_2O_3+Fe_2O_3$ in the composition. The minimum limit of $SiO_2+Al_2O_3+Fe_2O_3$ for Class F fly ash is 70% and for Class C fly ash is 50%. Thus, Class F fly ashes are more pozzolanic than the Class C fly ashes. Although not explicitly recognized in the ASTM C618 standard, Class C fly ashes typically have high calcium oxide (lime) content.

Class C fly ash usually has cementitious properties in addition to pozzolanic properties due to free lime (calcium oxide), whereas Class F is rarely cementitious when mixed with water alone. Presence of high calcium oxide content makes Class C fly ashes possess cementitious properties leading to the formation of calcium silicate and calcium aluminate hydrates when mixed with water. As will be seen in the examples below, Class C fly ash has been found to provide superior results, particularly in the preferred formulations in which calcium aluminate cement and gypsum are not used.

Typically at least 50 wt. % of the fly ash in the cementitious reactive powder is Type C fly ash. More typically at least 75 wt. % of the cementitious reactive powder is Type C fly ash. Still more preferably at least 88.5 wt. % of the cementitious reactive powder is Type C fly ash.

Typical minerals found in fly ash are quartz ($SiO_2$), mullite ($Al_2Si_2O_{13}$), gehlenite ($Ca_2Al_2SiO_7$), haematite ($Fe_2O_3$), magnetite ($Fe_3O_4$), among others. In addition, aluminum silicate polymorphs minerals commonly found in rocks such as sillimanite, kyanite and andalusite all three represented by molecular formula of $Al_2SiO_5$ are also found in fly ash.

A typical suitable Class C fly ash made from sub-bituminous coal has the following composition listed in TABLE B.

TABLE B

| Component | Proportion (wt. %) |
|---|---|
| $SiO_2$ | 20-40 |
| $Al_2O_2$ | 10-30 |
| $Fe_2O_3$ | 3-10 |
| MgO | 0.5-8 |
| $SO_3$ | 1-8 |
| C | 0.5-2 |
| $H_2O$ | 0.33-3 |
| CaO | 25-35 |
| $K_2O$ | 0.5-4 |
| $Na_2O$ | 0.5-6 |

The fineness of the fly ash is typically such that less than about 34% is retained on a 325 mesh sieve (U.S. Series) as tested on ASTM Test Procedure C-311 ("Sampling and Testing Procedures for Fly Ash as Mineral Admixture for Portland Cement Concrete"). This fly ash is preferably recovered and used dry because of its self-setting nature.

Hydraulic Cement

Fly ash makes up substantially all of the cementitious material of the reactive powder of the invention. In some instances the reactive powder may also include optional cementitious additives such as hydraulic cements or gypsum may be added. However, these optional cementitious additives are not preferred since they reduce the ultimate compressive strength of the lightweight aggregate compositions of the invention.

Hydraulic cements are materials that set and harden after being combined with water, as a result of chemical reactions with the mixing water, and that, after hardening, retain strength and stability even under water. Portland cement is a typical hydraulic cement. It is to be understood that, as used here, "hydraulic cement" does not include gypsum, which does not gain strength under water, although typically some gypsum is included in portland cement. ASTM C 150 standard specification for portland cement defines portland cement as a hydraulic cement produced by pulverizing clinker consisting essentially of hydraulic calcium silicates, usually containing one or more of the forms of calcium sulfate as an inter-ground addition.

To manufacture portland cement, an intimate mixture of limestone and clay is ignited in a kiln to form portland cement clinker. The following four main phases of portland cement are present in the clinker-tricalcium silicate ($3CaO \cdot SiO_2$, also referred to as $C_3S$), dicalcium silicate ($2CaO \cdot SiO_2$, called $C_2S$), tricalcium aluminate ($3CaO \cdot Al_2O_3$ or $C_3A$), and tetracalcium aluminoferrite ($4CaO \cdot Al_2O_3 \cdot Fe_2O_3$ or $C_4AF$). The resulting clinker containing the above compounds is inter-ground with calcium sulfates to desired fineness to produce the portland cement.

The other compounds present in minor amounts in portland cement include double salts of alkaline sulfates, calcium oxide, and magnesium oxide. When cement boards are to be made with Portland cement, the portland cement will typically be in the form of very fine particles such that the particle surface area is greater than 4,000 $cm^2$/gram and typically between 5,000 to 6,000 $cm^2$/gram as measured by the Blaine surface area method (ASTM C 204). Of the various recognized classes of portland cement, ASTM Type III portland cement is most preferred in the cementitious reactive powder of the cementitious compositions of the invention. This is due to its relatively faster reactivity and high early strength development.

In the present invention, the need for the use of hydraulic cement, like Type III portland cement is avoided, and relatively fast early age strength development can be obtained using only fly ash instead of mixtures containing Type III portland cement. Other recognized types of cements which are not needed in the composition of the invention include Type I portland cement or other hydraulic cements including Type II portland cement, white cement, slag cements such as blast-furnace slag cement, and pozzolan blended cements, expansive cements, calcium sulfo-aluminate cements, and oil-well cements.

Calcium Aluminate Cement

Calcium aluminate cement (CAC) is another type of hydraulic cement that may form a component of the reactive powder blend of some embodiments of the invention when higher compressive strength is not required with low water content slurries containing substantial amounts of fly ash.

Calcium aluminate cement (CAC) is also commonly referred to as aluminous cement or high alumina cement. Calcium aluminate cements have a high alumina content, about 36-42 wt % is typical. Higher purity calcium aluminate cements are also commercially available in which the alumina content can range as high as 80 wt %. These higher purity calcium aluminate cements tend to be very expensive relative to other cements. The calcium aluminate cements used in the compositions of some embodiments of the invention are finely ground to facilitate entry of the aluminates into the aqueous phase so that rapid formation of ettringite and other calcium aluminate hydrates can take place. The surface area of the calcium aluminate cement that may be used in some embodiments of the composition of the invention will be greater than 3,000 $cm^2$/gram and typically about 4,000 to 6,000 $cm^2$/gram as measured by the Blaine surface area method (ASTM C 204).

Several manufacturing methods have emerged to produce calcium aluminate cement worldwide. Typically, the main raw materials used in the manufacturing of calcium aluminate cement are bauxite and limestone. One manufacturing method that has been used in the US for producing calcium aluminate cement is described as follows. The bauxite ore is first crushed and dried, then ground along with limestone. The dry powder comprising of bauxite and limestone is then fed into a rotary kiln. A pulverized low-ash coal is used as fuel in the kiln. Reaction between bauxite and limestone takes place in the kiln and the molten product collects in the lower end of the kiln and pours into a trough set at the bottom. The molten clinker is quenched with water to form granulates of the clinker, which is then conveyed to a stock-pile. This granulate is then ground to the desired fineness to produce the final cement.

Several calcium aluminate compounds are formed during the manufacturing process of calcium aluminate cement. The predominant compound formed is monocalcium aluminate ($CaO \cdot Al_2O_3$, also referred to as CA). The other calcium aluminate and calcium silicate compounds that are formed include $12CaO \cdot 7Al_2O_3$ also referred to as $C_{12}A_7$, $CaO \cdot 2Al_2O_3$ also referred as $CA_2$, dicalcium silicate ($2CaO \cdot SiO_2$, called $C_{2-S}$), dicalcium alumina silicate ($2CaO \cdot Al_2O_3 \cdot SiO_2$, called $C_2AS$). Several other compounds containing relatively high proportion of iron oxides are also formed. These include calcium ferrites such as $CaO \cdot Fe_2O_3$ or CF and $2CaO \cdot Fe_2O_3$ or $C_2F$, and calcium alumino-ferrites such as tetracalcium aluminoferrite ($4CaO \cdot Al_2O_3 \cdot Fe_2O_3$ or $C_4AF$), $6CaO \cdot Al_2O_3 \cdot 2Fe_2O_3$ or $C_6AF_2$) and $6CaO \cdot 2Al_2O_3 \cdot Fe_2O_3$ or $C_6A_2F$). Other minor constituents present in the calcium aluminate cement include magnesia (MgO), titanic ($TiO_2$), sulfates and alkalis.

Calcium Sulfate

Various forms of calcium sulfate as shown below may be used in the invention to provide sulfate ions for forming ettringite and other calcium sulfo-aluminate hydrate compounds:

Dihydrate—$CaSO_4 \cdot 2H_2O$ (commonly known as gypsum or landplaster)

Hemihydrate—$CaSO_4 \cdot \frac{1}{2}H_2O$ (commonly known as stucco or plaster of Paris or simply plaster)

Anhydrite—$CaSO_4$ (also referred to as anhydrous calcium sulfate)

Landplaster is a relatively low purity gypsum and is preferred due to economic considerations, although higher purity grades of gypsum could be used. Landplaster is made from quarried gypsum and ground to relatively small particles such that the specific surface area is greater than 2,000 $cm^2$/gram and typically about 4,000 to 6,000 $cm^2$/gram as measured by the Blaine surface area method (ASTM C 204). The fine particles are readily dissolved and supply the gypsum needed to form ettringite. Synthetic gypsum obtained as a by-product from various manufacturing industries can also be used as a preferred calcium sulfate in the present invention. The other two forms of calcium sulfate, namely, hemihydrate and anhydrite may also be used in the present invention instead of gypsum, i.e., the dihydrate form of calcium sulfate.

Alkali Metal Salts of Citric Acid

In the present invention, use of alkali metal salts of citric acid such as sodium or potassium citrate, makes mixes with relatively good fluidity and which do not stiffen too quickly, i.e., do not stiffen faster than 5-10 minutes after mixing at temperatures above room temperature, while achieving good early age compressive strength.

The dosage of alkali metal salt of citric acid, e.g. potassium citrate or sodium citrates, is about 1.5 to 6.0 wt. %, preferably about 1.5 to 4.0 wt. %, more preferably about 2.0 to 3.5 wt. % and most preferably about 3.5 wt % based on 100 parts of the cementitious reactive components of the invention. Thus for example, for 100 pounds of cementitious reactive powder, there may be about 1.5 to 4.0 total pounds of potassium and/or sodium citrates. The preferred alkali metal citrates are potassium citrates and sodium citrates and particularly tri-potassium citrate monohydrate and tri-sodium citrate monohydrate.

Set Retarders

Use of set retarders as a component in the compositions of the invention is particularly helpful in situations where the initial slurry temperatures used to form the cement-based products are particularly high, typically greater than 100° F. (38° C.). At such relatively high initial slurry temperatures, retarders promote physical and chemical reaction between different reactive components in the compositions resulting in favorable slurry temperature rise response and rapid setting behavior. Without the addition of retarders, stiffening of the reactive powder blend of the invention may occur very rapidly, soon after water is added to the mixture. Rapid stiffening of the mixture, also referred to as "false setting" is undesirable, since it interferes with the proper and complete formation of ettringite, hinders the normal formation of calcium silicate hydrates at later stages, and leads to development of extremely poor and weak microstructure of the hardened cementitious mortar.

The primary function of a retarder in the composition is to keep the slurry mixture from stiffening too rapidly thereby promoting synergistic physical interaction and chemical reaction between the different reactive components. Other secondary benefits derived from the addition of retarder in the composition include reduction in the amount of superplasticizer and/or water required to achieve a slurry mixture of workable consistency. All of the aforementioned benefits are achieved due to suppression of false setting. Examples of set retarders include boric acid, borax, citric acid, potassium tartrate, sodium tartrate, and the like.

Furthermore, since set retarders prevent the slurry mixture from stiffening too rapidly, their addition plays an important role and is instrumental in the formation of good edges during the cement board manufacturing process. The weight ratio of the set retarder to the cementitious reactive powder blend generally is less than 1.0 wt %, preferably about 0.04-0.3 wt %.

In the present invention, it has been found that use of conventional retarders like citric acid, tartaric acid, malic acid, acetic acid, boric acid, etc. can be avoided with the use of only the alkali metal salts of citric acid, e.g., sodium or potassium citrate, and use of these alkali metal citrates, in the absence of these conventional set retarders, provides for good fluidity and prevents the concrete slurry from stiffening too quickly.

Secondary Inorganic Set Accelerators

As discussed above, the alkali metal citrates are primarily responsible for imparting extremely rapid setting characteristics as well as compressive strength to the cementitious mixtures. However, in combination with the alkali metal citrates, other inorganic set accelerators may be added as secondary inorganic set accelerators in the cementitious composition of the invention.

Addition of these secondary inorganic set accelerators is expected to impart only a small reduction in setting time in comparison to the reduction achieved due to the addition of the alkali metal citrate. Examples of such secondary inorganic set accelerators include a sodium carbonate, potassium carbonate, calcium nitrate, calcium nitrite, calcium formate, calcium acetate, calcium chloride, lithium carbonate, lithium nitrate, lithium nitrite, aluminum sulfate, alkanolamines, polyphosphates sodium hydroxide, potassium hydroxide and the like. The use of potassium hydroxide, sodium hydroxide and calcium chloride should be avoided when corrosion of cement board fasteners is of concern. Secondary inorganic set accelerators are normally not needed. The use of secondary set accelerators is not required and is not a part of the preferred composition of the invention. If used, the weight ratio of the secondary inorganic set accelerator to 100 parts by weight of the cementitious reactive powder blend typically will be less than about 1.0 wt. %, preferably less than about 0.25 wt %. These secondary inorganic set accelerators can be used alone or in combination.

Preferably lithium carbonate and potassium carbonate are not employed.

Other Chemical Additives and Ingredients

Chemical additives, such as water reducing agents (superplasticizers), may be included in the compositions of the invention. They may be added in the dry form or in the form of a solution. Superplasticizers help to reduce the water demand of the mixture. Examples of superplasticizers include polynapthalene sulfonates, polyacrylates, polycarboxylates, lignosulfonates, melamine sulfonates, and the like.

Depending upon the type of superplasticizer used, the weight ratio of the superplasticizer (on dry powder basis) to the reactive powder blend typically will be about 2 wt. % or less, preferably about 0.1 to 1.0 wt. %.

When it is desired to produce lightweight products such as lightweight cement boards, air-entraining agents (or foaming agents) may be added in the composition to lighten the product.

Air entraining agents are added to the cementitious slurry to form air bubbles (foam) in situ. Air entraining agents are typically surfactants used to purposely trap microscopic air bubbles in the concrete. Alternatively, air entraining agents are employed to externally produce foam which is introduced into the mixtures of the compositions of the invention during the mixing operation to reduce the density of the product. Typically to externally produce foam the air entraining agent (also known as a liquid foaming agent), air and water are mixed to form foam in a suitable foam generating apparatus and then the foam is added to the cementitious slurry.

Examples of air entraining/foaming agents include alkyl sulfonates, alkylbenzolfulfonates and alkyl ether sulfate oligomers among others. Details of the general formula for these foaming agents can be found in U.S. Pat. No. 5,643,510 incorporated herein by reference.

An air entraining agent (foaming agent) such as that conforming to standards as set forth in ASTM C 260 "Standard Specification for Air-Entraining Admixtures for Concrete" (Aug. 1, 2006) can be employed. Such air entraining agents are well known to those skilled in the art and are described in the Kosmatka et al "Design and Control of Concrete Mixtures," Fourteenth Edition, Portland Cement Association, specifically Chapter 8 entitled, "Air Entrained Concrete," (cited in US Patent Application Publication No. 2007/0079733 A1). Commercially available air entraining materials include vinsol wood resins, sulfonated hydrocarbons, fatty and resinous acids, aliphatic substituted aryl sulfonates, such as sulfonated lignin salts and numerous other interfacially active materials which normally take the form of anionic or nonionic surface active agents, sodium abietate, saturated or unsaturated fatty acids and salts thereof, tensides, alkyl-aryl-sulfonates, phenol ethoxylates, lignosulfonates, resin soaps, sodium hydroxystearate, lauryl sulfate, ABSs (alkylbenzenesulfonates), LASs (linear alkylbenzenesulfonates), alkanesulfonates, polyoxyethylene alkyl(phenyl)ethers, polyoxyethylene alkyl(phenyl)ether sulfate esters or salts thereof, polyoxyethylene alkyl(phenyl)ether phosphate esters or salts thereof, proteinic materials, alkenylsulfosuccinates, alpha-olefinsulfonates, a sodium salt of alpha olefin sulphonate, or sodium lauryl sulphate or sulphonate and mixtures thereof.

Typically the air entraining (foaming) agent is about 0.01 to 1 wt. % of the weight of the overall cementitious composition.

Other chemical admixtures such as shrinkage control agents, coloring agents, viscosity modifying agents (thickeners) and internal curing agents may also be added in the compositions of the invention if desired.

Scrims

Discrete reinforcing fibers of different types may also be included in the cementitious compositions of the invention. Scrims made of materials such as polymer-coated glass fibers and polymeric materials such as polypropylene, polyethylene and nylon may be used to reinforce the cement-based product depending upon its function and application. Cement boards, produced according to the present invention, are typically reinforced with scrims made of polymer-coated glass fibers.

Aggregates and Fillers

While the disclosed cementitious reactive powder blend defines the rapid setting component of the cementitious composition of the invention, it will be understood by those skilled in the art that other materials may be included in the composition depending on its intended use and application.

For instance, for cement board applications, it is desirable to produce lightweight boards without unduly compromising the desired mechanical properties of the product. This objective is achieved by adding lightweight aggregates and fillers. Examples of useful lightweight aggregates and fillers include blast furnace slag, volcanic tuff, pumice, expanded forms of clay, shale, and perlite, hollow ceramic spheres, hollow plastic spheres, expanded plastic beads, and the like. For producing cement boards, expanded clay and shale aggregates are particularly useful. Expanded plastic beads and hollow plastic spheres when used in the composition are required in very small quantity on weight basis owing to their extremely low bulk density.

Depending on the choice of lightweight aggregate or filler selected, the weight ratio of the lightweight aggregate or filler to the reactive powder blend may be about 1/100 to 200/100, preferably about 2/100 to 125/100. For example, for making lightweight cement boards, the weight ratio of the lightweight aggregate or filler to the reactive powder blend preferably will be about 2/100 to 125/100. In applications where the lightweight product feature is not a critical criterion, river sand and coarse aggregate as normally used in concrete construction may be utilized as part of the composition of the invention.

Initial Slurry Temperature

In the present invention, forming the slurry under conditions which provide an initially high slurry temperature was found to be important to achieve rapid setting and hardening of cementitious formulations. The initial slurry temperature should be at least about room temperature to about 35° C. Slurry temperatures in the range of 38° C. to 41° C. produce short setting times. The initial slurry temperature is preferably about 38° to 41° C.).

In general, within this range increasing the initial temperature of the slurry increases the rate of temperature rise as the reactions proceed and reduces the setting time. Thus, an initial slurry temperature of 95° F. (35° C.) is preferred over an initial slurry temperature of 90° F. (32.2° C.), a temperature of 100° F. (37.7° C.) is preferred over 95° F. (35° C.), a temperature of 115° F. (41.1° C.) is preferred over 100° F. (37.7° C.), a temperature of 110° F. (40.6° C.) is preferred over 105° F. (41.1° C.) and so on. It is believed the benefits of increasing the initial slurry temperature decrease as the upper end of the broad temperature range is approached.

As will be understood by those skilled in the art, achieving an initial slurry temperature may be accomplished by more than one method. Perhaps the most convenient method is to heat one or more of the components of the slurry. In the examples, the present inventors supplied water heated to a temperature such that, when added to the dry reactive powders and unreactive solids, the resulting slurry is at the desired temperature. Alternatively, if desired the solids could be provided at above ambient temperatures. Using steam to provide heat to the slurry is another possible method that could be adopted.

Although potentially slower, a slurry could be prepared at ambient temperatures, and promptly (e.g., within about 10, 5, 2 or 1 minutes) heated to raise the temperature to about 90° F. or higher (or any of the other above-listed ranges), and still achieve benefits of the present invention.

Manufacturing of Precast Concrete Products Such as Cement Boards

Precast concrete products such as cement boards are manufactured most efficiently in a continuous process in which the reactive powder blend is blended with aggregates, fillers and other necessary ingredients, followed by addition of water and other chemical additives just prior to placing the mixture in a mold or over a continuous casting and forming belt.

Due to the rapid setting characteristics of the cementitious mixture it should be appreciated that the mixing of dry components of the cementitious blend with water usually will be done just prior to the casting operation. As a consequence of the formation of the alkali alumino silicate hydrates and/or other hydrates of alumino silicates and/or calcium alumino silicate compounds, the concrete product becomes rigid, ready to be cut, handled and stacked for further curing.

EXAMPLES

The following examples illustrate the influence of potassium citrate and sodium citrate addition on the slurry temperature rise behavior, setting characteristics and cube compressive strength (CCS) of the cementitious compositions of the invention including, a mixture of portland cement, class C fly ash, and calcium sulfate dihydrate (landplaster) as the components of the reactive powder.

The admixtures used to activate the fly ash, such as potassium citrate, sodium citrate and optional additives such as citric acid, borax, boric acid were added to the mixing water prior to mixing with the fly ash, cement and any optional lightweight aggregate.

The compositions described herein were combined using a weight ratio of expanded clay aggregate to cement (Reactive powder) of 0.56:1.0.

The temperature of the liquids was adjusted prior to mixing with cements to obtain a specific mix temperature. After mixing in a Hobart mixer, the mix of about 280 grams was placed in a 6 ounce STYROFOAM cup and placed in an insulated STYROFOAM box. The temperature response was measured continuously using a computerized data collection application provided by Fluke Corporation, Everett, Wash. 98203, as part of its HYDRA SERIES Portable Data Acquisition products.

Final setting times were determined with Gilmore needles according to the procedure set forth in ASTM C266. The cubes were kept inside a sealed plastic bag containing a moist towel at a temperature of 68° C. until the 3-hr. test and cubes for the 14 day test were cured for 24 hrs at 68° C. and then removed from an incubator and further cured at room temperature. In some cases example mixes were cast using room temperature water and cubes were kept at room temperature until the time of the test. The maximum load required to crush the cubes was measured using a SATEC UTC 120HVL compression machine programmed to meet the rate of loading specified in the procedure in ASTM C109.

The pH for some of the mixes was measured by pulverizing the samples using a FRITSCH pulverisette machine after the compressive strength test measurements described above. Only the inside of the crushed cube samples were used. The pH of the pulverized material was measured by preparing a 1:1 ratio sample of dry powder to water and tested at room temperature using a Fisher Scientific ACCUMET BASIC AB-15 pH meter while stirring the solution at a speed relative to the consistency of the solution so that mixing occurred. The pH was recorded when changes in pH over 1 minute were not larger than 0.02 pH (approximately 5 minutes).

The compositions included in Examples 1 through 5 were combined using a weight ratio of expanded clay aggregate to fly ash, cement and gypsum (reactive powder) of about 0.56/1.

The temperature of the liquids was adjusted prior to mixing with cements to obtain a specific mix temperature. After mixing in a Hobart mixer the mix (about 280 grams) was placed in a 6 ounces STYROFOAM cup and placed in an insulated STYROFOAM box. The temperature response was measured continuously using a computerized data collection program. The maximum temperature rise rate, as well as the maximum temperature and time to maximum temperature were used as indications of the reactivity of the experimental mixtures.

Initial and final set times were determined with Gilmore needles according to ASTM C266. The target was to reach a final set within less than 10 minutes, preferably 5 to 7 minutes, after mixing. For the compressive strength testing cubes (2 inch×2 inch×2 inches) (5.1 cm×5.1 cm×5.1 cm) were kept inside a sealed plastic bag containing a moist towel at a temperature of 68° C. (154° F.) until the time of the test. The compressive strength of 3 cubes from each mix was determined 5 hours after the addition of the mix liquids. The maximum load required to crush the cubes was measured using a SATEC UTC 120HVL compression machine programmed to meet the rate of loading specified by procedure ASTM C109.

The raw materials and ingredients used in these examples were as follows:
Type III portland cement
Gypsum (e.g. Landplaster)
Class C fly ash
Expanded clay aggregate
Boric Acid
Borax
Citric Acid
Sodium citrate (Tri-sodium citrate monohydrate)
Potassium citrate (Tri-potassium citrate monohydrate)
Potassium hydroxide In the examples below, the dry reactive powder ingredients and any aggregate used were mixed with water under conditions which provided an initial slurry temperature above ambient. Typically hot water was used having a temperature which produced slurry having an initial temperature within the range of 90°-115° F. (32-41° C.).

The weight ratio of water to reactive powder is typically in the range of 0.2 to 0.30:1.0, with lower weight ratios of 0.2 to 0.23:1 being preferred when the reactive powder is substantially 100 wt % fly ash and the amount of portland cement and gypsum are minimized in accordance with the preferred practice of the invention.

The examples report setting of the composition, characterized by initial and final set times, as measured using the above-mentioned Gilmore needles specified in the ASTM C266 test procedure, as well as high initial compressive strength as per ASTM C109.

Example 1

Mixes 1-8

Table 1 shows the compositions of mixes containing portland cement type III and class C fly ash in the weight ratios of 20/100 and various dosages of sodium citrate with boric acid, borax or citric acid. In these compositions the level of potassium hydroxide was kept constant at 1.8% by weight of fly ash and portland cement. From Table 1, the data shows that increasing sodium citrate shortens final setting times and increases the early age compressive strength. A comparison of mixes 1, 3 and 4 with sodium citrate dosages of 5.4, 10.8 and 16.2 grams, respectively, shows final set time were reduced to 11, 8.1, and 5.5 minutes, respectively. In comparing compressive strengths (C.S.) after 3 hrs. (early-age compressive strength) and after 14 days, mixes 2, 5 and 7, containing identical amounts of boric acid, but with sodium citrate levels of 10.8, 16.2 and 21.8 grams, respectively, showed the compressive strength measured after 3 hours and 14 days increased as the sodium citrate increased.

The data in TABLE 1 also shows the effect of sodium citrate is diminished in the presence of borax compared to the effect of mixes containing boric acid. In comparing mixes 6 and 7 containing the same level (21.8 g) of sodium citrate but in the case of mix 6 using (7.2 g) citric acid and in the case of mix 7 using (7.2 g) of boric acid, the mix containing citric acid has a slightly better 3 hour compressive strength but similar 14 days compressive strength.

TABLE 1

| Mix | Sodium Citrate (g) | Boric Acid (g) | Borax (g) | Citric Acid (g) | KOH (g) | Set time (min) | Density (pcf) | C.S 3 hr. (psi) | C.S. 14 days (psi) |
|---|---|---|---|---|---|---|---|---|---|
| 1 | 5.4 | | 7.2 | | | 19.7 | 11.0 | 117.3 | 698 | 3594 |
| 2 | 10.8 | 7.2 | | | | 19.7 | 8.8 | 118.7 | 2311 | 4794 |
| 3 | 10.8 | | 7.2 | | | 19.7 | 8.1 | 116.3 | 1392 | 5422 |
| 4 | 16.2 | | 7.2 | | | 19.7 | 5.5 | 119.0 | 1163 | 1886 |
| 5 | 16.2 | 7.2 | | | | 19.7 | 5.5 | 118.9 | 3010 | 7697 |
| 6 | 16.2 | | | 7.2 | | 19.7 | 5.8 | 118.1 | 5088 | 7618 |
| 7 | 21.8 | 7.2 | | | | 19.7 | 6.5 | 122.6 | 4324 | 7529 |
| 8 | 21.8 | | | 7.2 | | 19.7 | 3.7 | 109.9 | 4330 | 3921 | g is grams
C.S. is compressive strength
In TABLE 1 all composition mixes contained 900 g Class C Fly Ash, 180 grams of Type III Portland Cement, 250 g water and 608 grams expanded clay lightweight aggregate.

Figure 2:
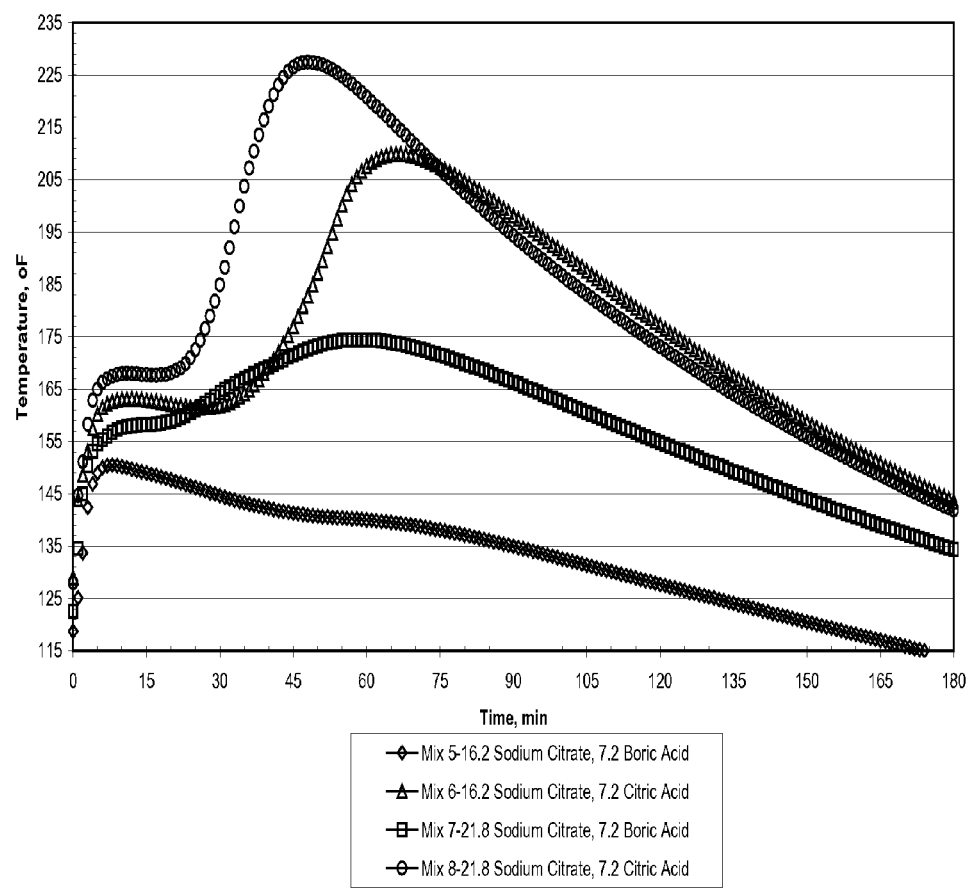
FIG. 2 is a graph of the results of is a graph of the results of Example 1 showing the effect of increasing sodium citrates on temperature rise for mixes with boric acid and citric acid.

The effect of increasing sodium citrate content on the mix temperature rise for mixes with borax, boric acid and citric acid is shown in the plotted graphs in FIG. 1 and FIG. 2. As can be seen in FIG. 1, mixes with higher dosages of sodium citrate have a sharper temperature rise during the first 5-10 minutes. In FIG. 2, it is noted the mixes containing citric acid achieved significantly higher temperature rise (about 230-230° F.) during the first 45 to 90 minutes after mixing. The rate of temperature rise is known in the art to be related to the rate of reaction and the setting time of the mixture. In viewing the results for mixes 6 and 8 containing 16.2 and 21.6 grams of sodium citrate and 7.2 grams of citric acid in FIGS. 1 and 2, these mixes have two distinct inflection points at about 2-3 minutes in FIG. 1 and at about 15 to 30 minutes in FIG. 2.

In the case of mixes 5 and 7 containing the same amount of sodium citrate and boric acid instead of citric acid, the second inflection point in FIG. 2 is not as well defined as in mixes 6 and 8. The first peak of the reaction is understood in the art to be related to the final compressive strength of the mixture, while the second peak is known to be related to the early-age compressive strength of the mixture. This comparison indicates the presence of citric acid facilitates a second reaction which correlates with the relatively higher early-age compressive strengths measured for mixes containing citric acid compared with the mixes containing boric acid.

Example 2

Another set of mixes labeled 1-5 was prepared. TABLE 2 shows these compositions containing 900 grams Type III portland cement, 180 grams class C fly ash, 250 grams water and 608 grams expanded clay lightweight aggregate.

TABLE 2 shows compositions containing portland cement type III and class C fly ash in the weight ratio of 20/100 containing various levels of potassium hydroxide and a constant dosage of sodium citrate (16.2 g) kept constant at 0.67 wt. % and 1.5% (by weight of fly ash and portland cement reactive powder) and citric acid (7.2 g).

The results from TABLE 2 shows that as the potassium hydroxide content increases, the setting time decreases and the early age strength as well as the compressive strength measured after 14 days increases. Mix 5 with a 19.7 g (1.8 wt. %) potassium hydroxide has a compressive strength after 14 days of 8604 psi and a setting time reduced to 4.0 minutes. The 3 hr compressive strength for mix 3 with 1% potassium hydroxide of 5072 psi was about double the 2482 psi compressive strength for mix 1, which contained 0.32 wt. % potassium hydroxide.

TABLE 2

Compositions[1] whose temperature rise is shown in FIG. 2

| Mix | Sodium citrate | Citric acid | KOH | Class C Fly ash | Type III Portland cement | Setting time min | Density pcf | Compressive strength Psi | |
|---|---|---|---|---|---|---|---|---|---|
| 1 | 16.2 | 7.2 | 3.5 | 900 | 180 | 19.6 | 115.0 | 2482 | 5840 |
| 2 | 16.2 | 7.2 | 5.6 | 900 | 180 | 11.7 | 116.2 | 4081 | 7566 |
| 3 | 16.2 | 7.2 | 11.2 | 900 | 180 | 6.0 | 117.5 | 5072 | 6829 |
| 4 | 16.2 | 7.2 | 15.5 | 900 | 180 | 5.1 | 117.1 | 5057 | 8443 |
| 5 | 16.2 | 7.2 | 19.7 | 900 | 180 | 4.0 | 117.6 | 5388 | 8604 |

[1]250 grams water and 608 grams expanded clay lightweight aggregate were added. The weight ratio of water to reactive powder was maintained at 0.23/1.0.

Figure 3:
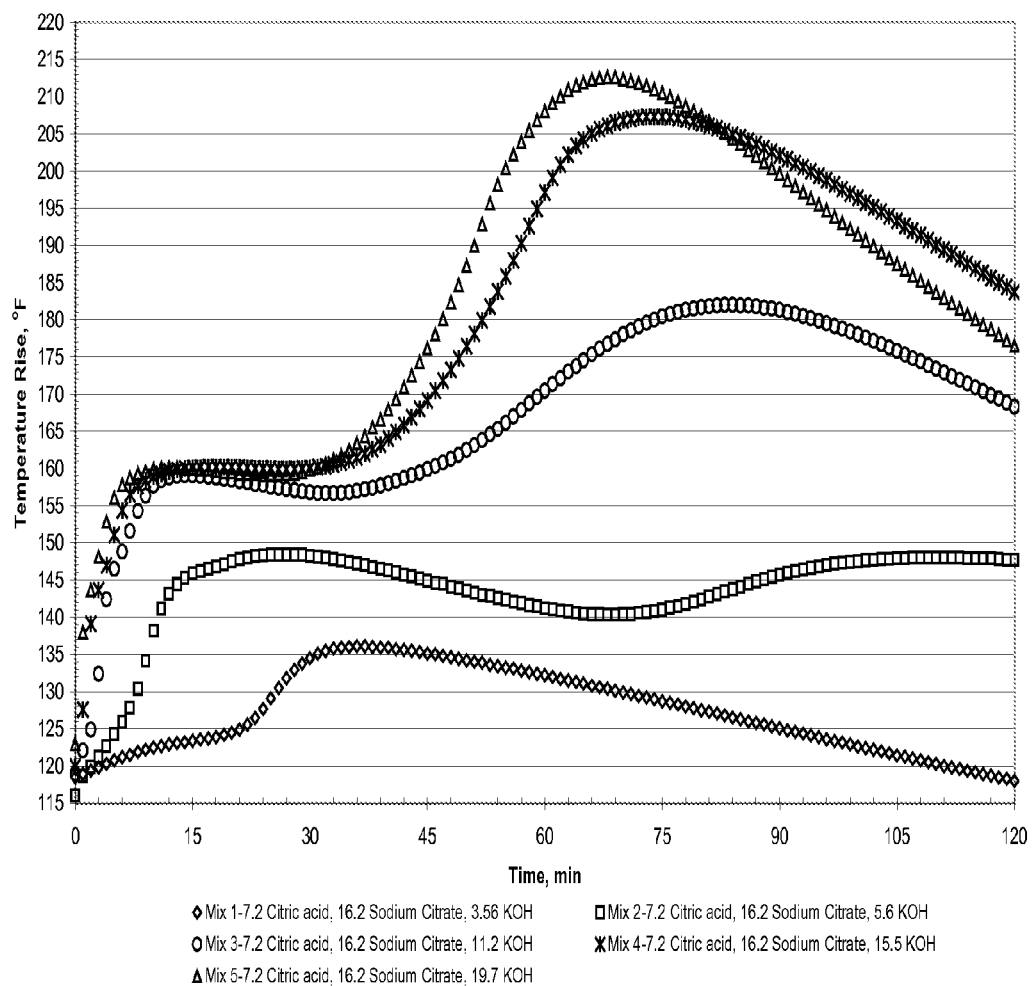
FIG. 3 is a graph of the results of Example 2 showing the effect of increasing potassium hydroxide on temperature rise for mixes with citric acid and sodium citrate.
Figure 4:
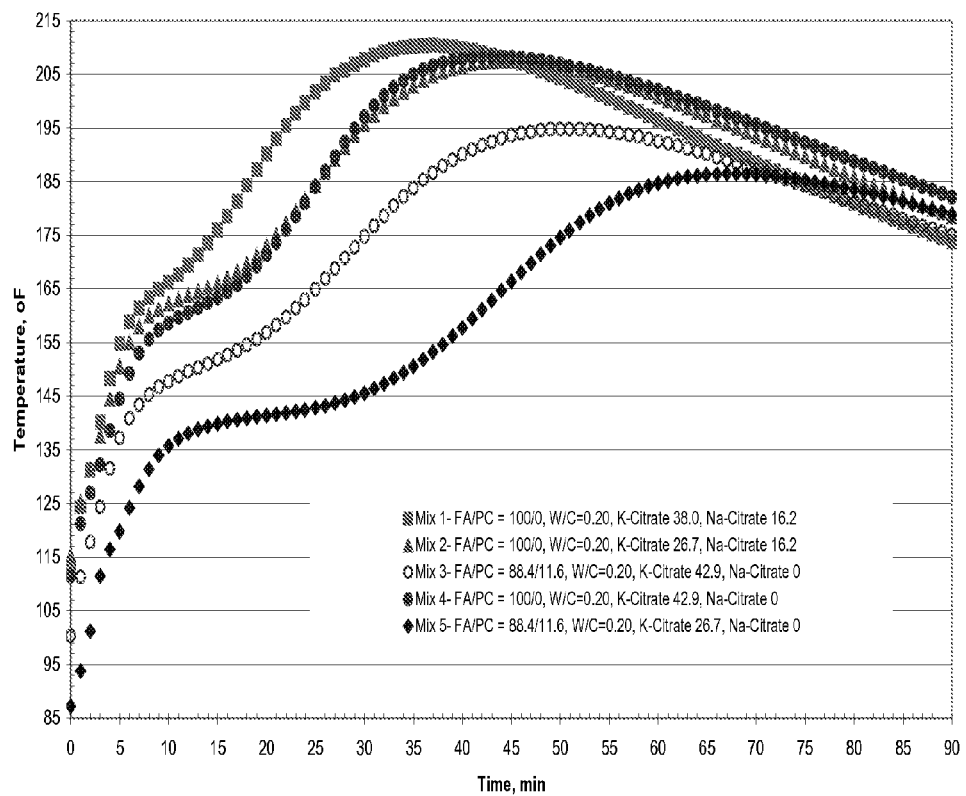
FIG. 4 is a graph of the results of Example 4 showing temperature rise for mixes with potassium citrate without potassium hydroxide.

The effect of increasing potassium hydroxide content on the mix temperature rise for the mixes in TABLE 2 is plotted in the graphs in FIGS. 3 and 4. As shown in FIG. 3, the rate of temperature rise for mixes 1 and 2 containing 3.5 g (0.32%) and 5.6 g. (0.52%) potassium hydroxide, respectively, was shallow compared to the relatively sharper rate of temperature rise during the first 5 minutes for mixes 3, 4 and 5 continuing 11.2 g (1.0%), 15.5 g (1.4%) and 19.7 g (1.8%) potassium hydroxide. The rate of temperature rise is correlated with the reaction rate and the setting time.

The graph in FIG. 4 shows increasing potassium hydroxide significantly increased the temperature rise of about 205° to 210° F. within 1 hour after mixing.

Example 3

Mixes 1-9

TABLE 3 shows detailed compositions with various weight ratios of portland cement type III and class C fly ash as well as various ratios of water to reactive solids. The weights of potassium citrate, sodium citrate and citric acid were kept constant at 1.8%, 1.5% and 0.67%, respectively by weight of the fly ash and portland cement. Expanded clay lightweight aggregate of 600 grams was added to each mix. As shown in TABLE 3, increasing the fly ash content and reducing the water content shortened the setting time to about 6 minutes and increased the 3-hr. compressive strength to almost 6000 psi. It is also observed the effect of reducing water to cement ratio has a more pronounced effect on the compressive strength of mixes containing fly ash and no portland cement.

TABLE 3

Compositions all contain 600 g expanded clay lightweight
aggregate, 16.2 g sodium citrate, 7.2 g citric acid, 19.7 g KOH

| Mix | Water Weight, grams | Class C Fly Ash | Type III Portland Cement | Setting Time min | Density pcf | Compressive Strength psi 3 hr | 14 days |
|---|---|---|---|---|---|---|---|
| 1 | 280.0 | 395 | 685 | 13.0 | 116.4 | 3663 | 8085 |
| 2 | 280.0 | 540 | 540 | 10.0 | 118.7 | 5213 | 10743 |
| 3 | 280.0 | 685 | 395 | 8.0 | 112.3 | 3809 | 5905 |
| 4 | 280.0 | 955 | 125 | 7.0 | 115.9 | 4751 | 9352 |
| 5 | 248.0 | 955 | 125 | 5.8 | 115.9 | 4654 | 9133 |
| 6 | 216.0 | 955 | 125 | 3.8 | 115.5 | 3952 | 7312 |
| 7 | 280.0 | 1080 | 0 | 14.0 | 114.8 | 2757 | 8313 |
| 8 | 248.0 | 1080 | 0 | 10.5 | 116.8 | 3677 | 8682 |
| 9 | 216.0 | 1080 | 0 | 6.0 | 118.2 | 5905 | 7782 |

Example 4

Mixes 1-5

Another set of mixes of lightweight aggregate cementitious compositions, labeled Mixes 1-5, were made. The compositions shown in TABLE 4 contain various dosages of potassium citrate or sodium citrate for mixes containing two different weight ratios of fly ash and portland cement.

As shown in TABLE 4, mixes such as 4 and 5, which only contain potassium citrate and no potassium hydroxide or citric acid, achieved final setting times in the range of about 5 minutes and had 3-hr. compressive strength of from 6000 to 7800 psi, which is over 60% of the strength of over 10,000 psi reached after 14 days. In comparing mixes 4 and 3, it is noted mix 4 with 100 wt. % fly ash and no portland cement had a higher compressive strength of 7823 psi compared to 5987 psi for mix 3 which contained 86.4% fly ash and 11.6% portland cement. Both mixes 3 and 4 had a potassium citrate content of 4.0 wt % by weight of the total fly ash and portland cement reactive powder.

In the case of mixes 3 and 5, the mix water temperature was reduced to 35° C. compared to 75° C. to prevent flash setting. The cubes tested after 14 days were kept at 65° C. for a period of 24 hours and then were kept at room temperature until the time of the test. The weight ratio of water to reactive powder was maintained at 0.2/1.0 for all of the mixes The use of portland cement under these test conditions produced mortars with lower compressive strength as the dosage of potassium citrate is increased. For example mix 3 with 4.0 wt. % potassium citrate had a compressive strength of 5987 psi compared 6927 psi measured for mix 5 which contained only 2.5 wt. % potassium citrate. There is a further compressive strength gain after the 3-hr strength and the 14 days strength increased to over 10,000 psi.

The data in TABLE 4 shows final setting times of 4.8 to 5.1 minutes can be achieved with compressive strengths in the range of over 5900 to over 7800 psi can be obtained in accordance with the present invention without need for the use of potassium hydroxide.

TABLE 4

All compositions contain 600 g expanded clay lightweight
aggregate and 216 g water.

| Mix | Sodium citrate | Potassium citrate | Class C Fly ash | Type III Portland cement | Setting time (min) | Density pcf | Compressive strength Psi 3-hr | 14 days |
|---|---|---|---|---|---|---|---|---|
| | | Wt. g | | | | | | |
| 1 | 16.2 | 38.0 | 1080 | 0 | 5.0 | 115.0 | 6091 | 9138 |
| 2 | 16.2 | 26.7 | 1080 | 0 | 5.1 | 116.9 | 6370 | 7114 |
| 3 | 0.0 | 42.9 | 955 | 125 | 4.8 | 117.4 | 5987 | 8735 |
| 4 | 0.0 | 42.9 | 1080 | 0 | 4.9 | 117.8 | 7823 | 10442 |
| 5 | 0.0 | 26.7 | 955 | 125 | 5.0 | 119.4 | 6927 | 10353 |

The graph in FIG. 4 shows mixes with potassium citrate or sodium citrate achieved relatively high temperatures during the first few minutes similar to the mixes which contained potassium hydroxide and citric acid in the previous examples.

Example 5

Mixes 1-7

Another set of mixes 1-7 of lightweight cementitious compositions were made. Mixes in this example contain sodium or potassium citrate without potassium hydroxide. The water used in the mixture was 216 g. of room temperature water at 24° C. compared to the 75° C. water used in most of the previous examples. The results shown in TABLE 5 indicate that mixes can achieve relatively high compressive strengths without the need for hot water. Mixes 1-5 contain weight ratios of fly ash and portland cement of 88.4:11.6, while mixes 6 and 7 have weight ratios of fly ash to Portland cement of 63.4:36.6 and 75.6:24.1, respectively.

As shown in TABLE 5, the mixes 1-2 with potassium citrate or mixes 3-5 with sodium citrate achieved final setting times within 5 to 8 minutes and 3-hr compressive strengths in the range of 5268 to over 5757 psi. It is noted for mixes 3-5, which contain 11.6 wt % portland cement, no benefit is obtained by increasing the potassium citrate content above 2.4 wt. %. The weight ratio of water to total reactive powder was 0.2/1.0.

The final setting times for mixes 6 and 7 containing fly ash and gypsum increased to 16 to 20 minutes and the 3-hr compressive strength was reduced significantly with increased amounts of gypsum to 3352 psi and 4271 psi, respectively. This suggests a pessimum interaction between the gypsum, fly ash, and the potassium citrate. To a lesser extent, 14 day compressive strength data was also reduced with increased amounts of gypsum.

TABLE 5

Compositions* used in Example 5

| Mix | Sodium citrate | Potassium citrate | Water | Class C Fly ash | Type III Portland cement | Gypsum | Setting time | Density | Compressive strength psi | |
|---|---|---|---|---|---|---|---|---|---|---|
| | Weight, grams | | | | | | min | pcf | 3-hr | 14 days |
| 1 | 0 | 16.2 | 216.0 | 955 | 125 | | NA | NA | NA | NA |
| 2 | 0 | 26.2 | 216.0 | 955 | 125 | | 6.5 | 116.6 | 5757 | 10286 |
| 3 | 21.2 | 0 | 216.0 | 955 | 125 | | 8.0 | 115.3 | 5268 | 7762 |
| 4 | 26.2 | 0 | 216.0 | 955 | 125 | | 5.0 | 118.6 | 5631 | 10957 |
| 5 | 42.4 | 0 | 216.0 | 955 | 125 | | 4.1 | 117.7 | 5562 | 11120 |
| 6 | | 42.4 | 216.0 | 685 | 0 | 395 | 19.5 | 113.9 | 3352 | 7620 |
| 7 | | 42.4 | 216.0 | 820 | 0 | 260 | 16.0 | 115.8 | 4271 | 8233 |

*600 g expanded clay lightweight aggregate added

Figure 5:
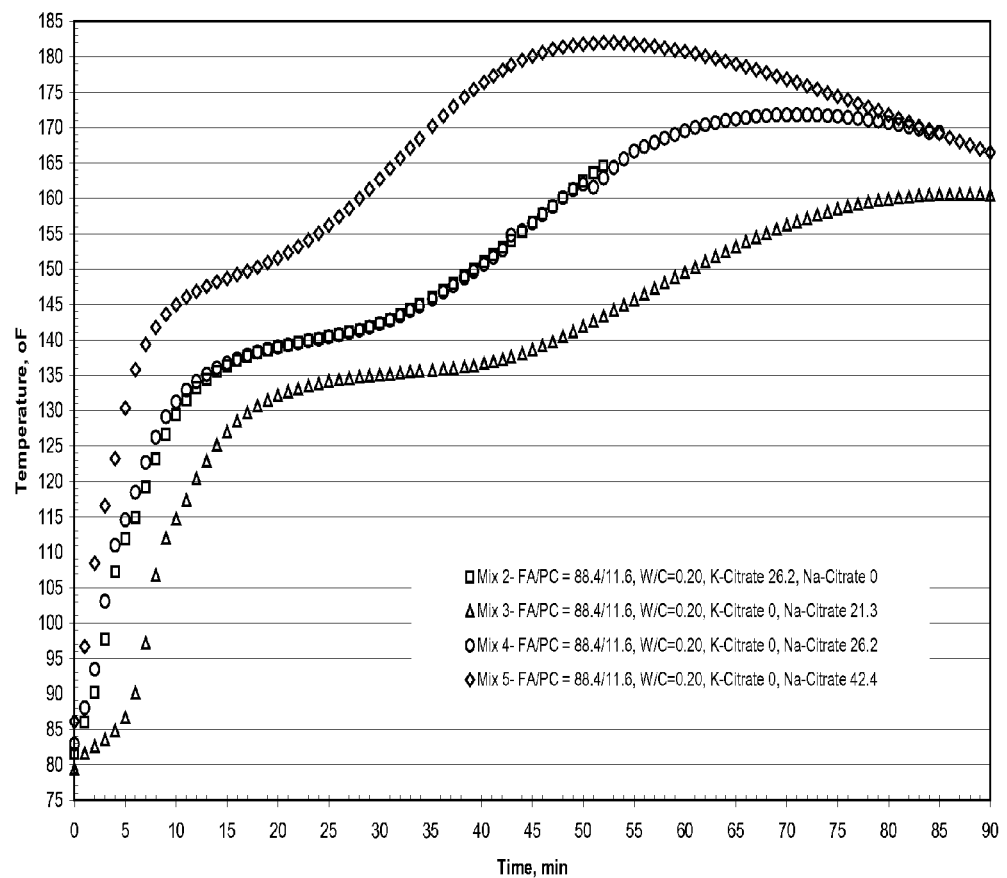
FIG. 5 is a graph of the results of Example 5 showing temperature rise for mixtures including potassium citrate or sodium citrate mixed with water at room temperature.

The graph in FIG. 5 shows the temperature rise for mixes that did not contain potassium hydroxide and which used water at room temperature, the mixes with potassium citrate and sodium citrate still achieved relatively high temperature during the first few minutes.

Example 6

This example summarizes the effect of adding portland cement and or silica fume on compressive strength of the fly ash/potassium citrate based compositions. The weight ratio of water to total reactive powder was maintained at 0.23/1.0. TABLE 6 shows the final setting time, density, compressive strength for these mixtures. TABLE 6 shows the densities for these mixes ranged between 112 to 117 pcf. Data included in TABLE 6 shows mix 4 containing 100% fly ash and zero percent portland cement or silica fume had a 3-hr compressive strength that was over 20% higher compared to mixes 1-3 which contained about 83% fly ash and about 17% of a blend of portland cement and silica fume. The 14 days compressive strength data shows about 30 to 40% higher compressive strength for mix 4 with 100% fly ash.

TABLE 6

Compositions described in Example 6 with 600 grams expanded clay lightweight aggregate and 250 g water

| Mix | K citrate | Class C fly ash | Portland cement | Silica Fume | Density pcf | Final Set min | CCS 3 hr psi | CCS 14 days psi |
|---|---|---|---|---|---|---|---|---|
| | | wt. grams | | | | | | |
| 1 | 43.2 | 900 | 180 | 0 | 111.5 | 4.5 | 3458 | 8296 |
| 2 | 43.2 | 900 | 150 | 30 | 116.7 | 6.5 | 5133 | 7320 |
| 3 | 43.2 | 870 | 180 | 30 | 116.9 | 6.0 | 5076 | 8741 |
| 4 | 43.2 | 1080 | 0 | 0 | 117.1 | 9.5 | 4217 | 10570 |

Example 7

Five mixes shown in TABLE 7 were prepared for testing of pH. Mixes 1-3 do not contain silica fume or gypsum and had higher 3-hr and 14 day compressive strengths than mix 4 which contained portland cement and gypsum as well as mix 5 which contained silica fume. The pH of mixes 1-3 were around 12.7 to 12.8. Mix 4 which contains fly ash and gypsum in a weight ratio of 63.4 to 36.6 had a pH of about 11 and mix 5 with a weight ratio of fly ash to silica fume of 94.4 to 5.6 also had a relatively low pH of 11.5. The weight ratio of water to total reactive powder was maintained at 0.20/1.0.

Thus, in compositions in which pH is more of a consideration than compressive strength, such as glass fiber reinforced concrete, mixtures of fly ash with gypsum or silica fume can be used to provide lower pH products.

TABLE 7

Compositions containing 600 g expanded clay lightweight aggregate and 216 g water

| Mix | K Citrate g. | Na Citrate g. | Class C Fly ash g. | Port. Cement g. | Silica Fume g. | Gypsum g. | pH | Set time Min. | Compressive Strength psi 3-hr | 14 days |
|---|---|---|---|---|---|---|---|---|---|---|
| 1 | 26.2 | | 955 | 125 | | | 12.78 | 6.5 | 5757 | 10286 |
| 2 | | 42.4 | 955 | 125 | | | 12.81 | 4.1 | 5562 | 11120 |
| 3 | | 26.2 | 955 | 125 | | | 12.71 | 5.0 | 5631 | 10957 |
| 4 | 42.4 | | 685 | 395 | | 395 | 11.09 | 19.5 | 3352 | 7620 |
| 5 | 26.2 | | 1020 | 0 | 60 | | 11.52 | 8.8 | 4878 | 8686 |

Example 8

Details of the formulations used in this example are included in TABLE 8. For these mixes the fly ash to portland cement ratio was varied at a potassium citrate dosage of 3.5% (by weight of fly ash plus portland cement) and a water to cementitious materials ratio (water:fly ash+portland cement) of 0.26 for mixes 1-4 and 0.30 for mixes 5-8. The results for the compressive strengths clearly indicate higher amounts of fly ash increased the 3-hr compressive strengths.

Figure 6:
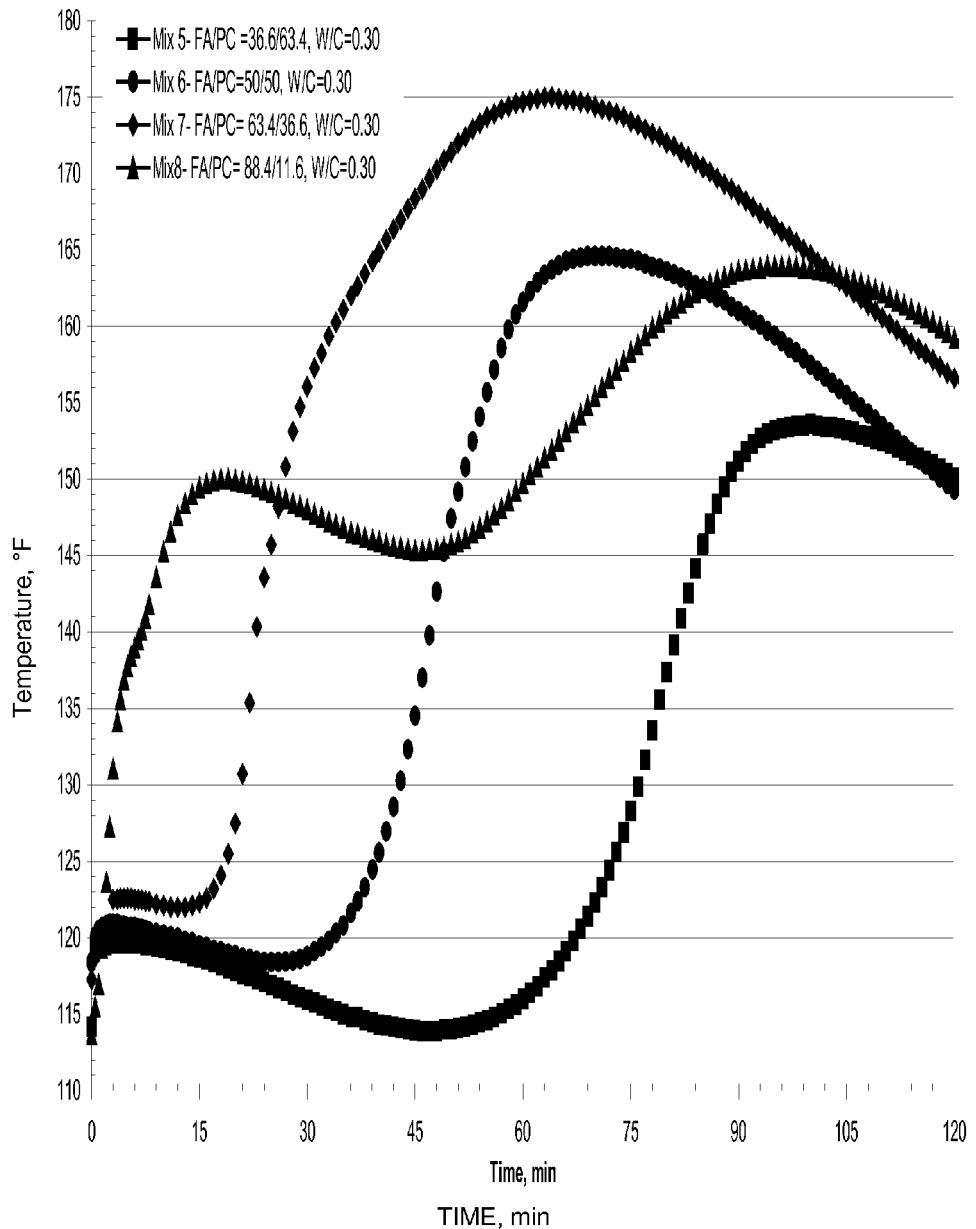
FIG. 6 is a graph of the results of Example 8 showing the temperature rise for mixes containing various ratios of fly ash and portland type III cement using a water to cement weight ratio of 0.30:1.

In addition, the temperature rise curves measured for mixes 4-7 are shown in FIG. 6. FIG. 6 shows the temperature achieved during the first 15 minutes is higher as the fly ash content is increased and the amount of portland cement is decreased at the same water to reactive powder ratio. The data was measured continuously and plotted at 1-minute intervals for sake of clarity in presenting the data points.

decreased and the amount of portland cement is increased. In addition, the final setting times for mixes with portland cement fall below the 5 minutes, which indicates a flash setting.

Figure 7:
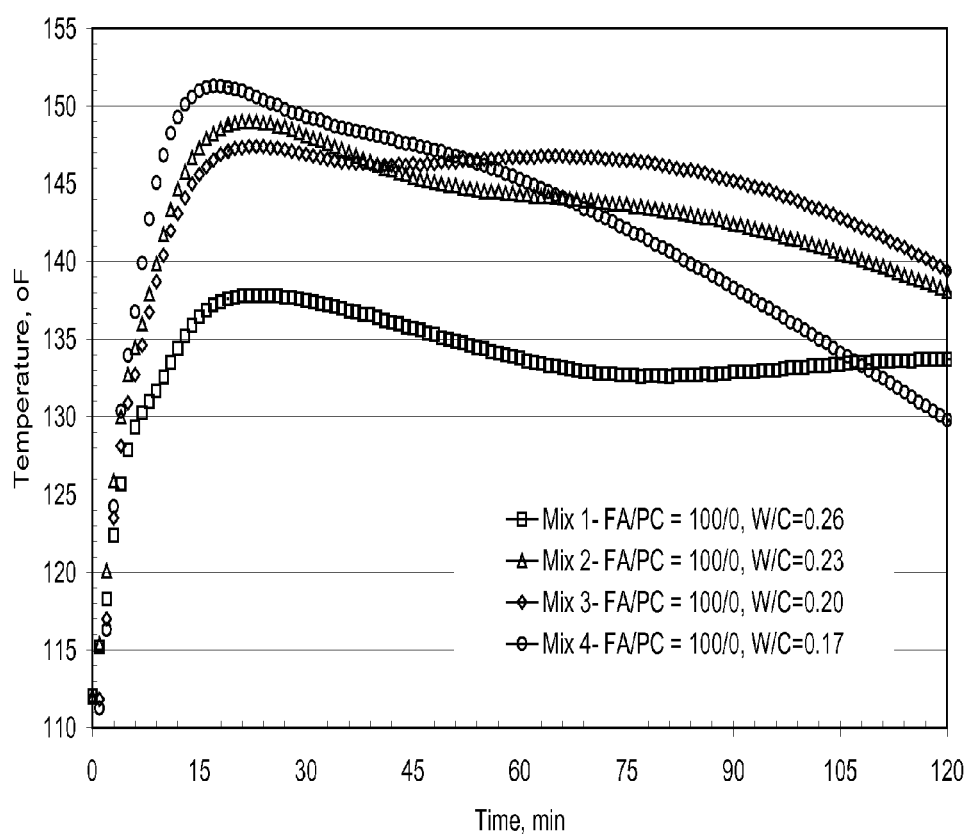
FIG. 7 is a graph of the results of Example 9 showing the effect of temperature rise for mixes 1-4 in this example with various ratios of water to fly ash without portland cement.

FIG. 7 shows the temperature rise for mixes 1-4 in this example. FIG. 7 shows, for mixes containing fly ash without portland cement, reducing the water content increases the maximum temperature.

Figure 8:
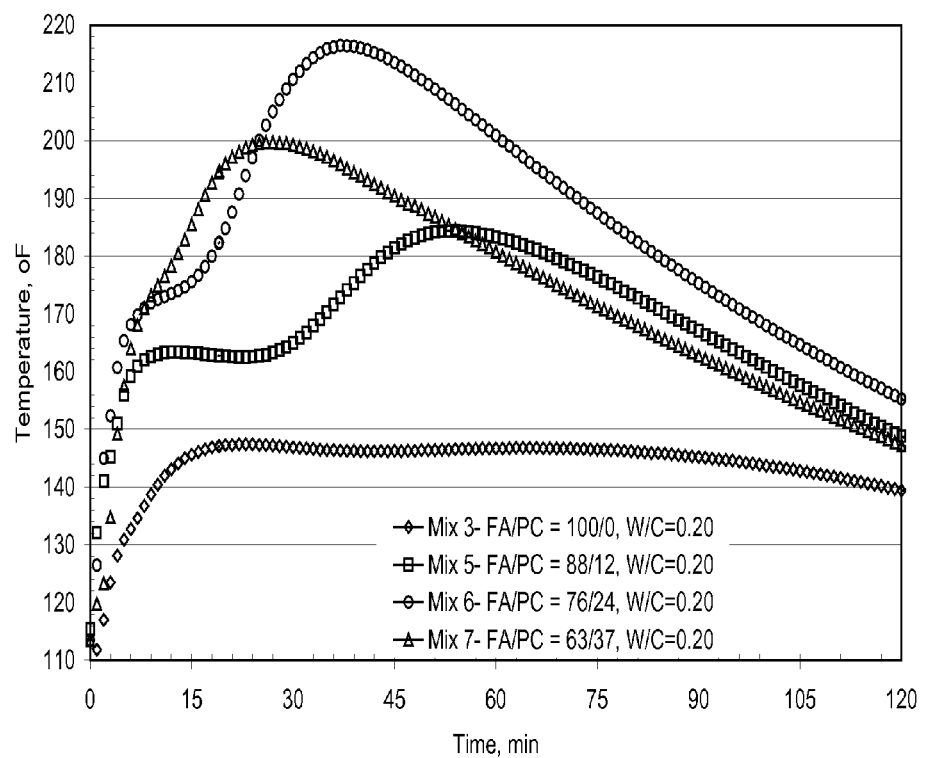
FIG. 8 is a graph of the results of Example 9 showing the temperature rise for mixes 3, 5, 6 and 7 for mixes with various ratios of fly ash and portland cement type III with citrate at a weight ratio of water to combined weight of fly ash and portland cement of 0.20:1.

FIG. 8 shows the temperature rise for mixes 3, 5, 6 and 7. FIG. 8 shows increasing portland cement adds a second inflection point to the temperature response which further increases the rate of temperature rise about 30 minutes after reaction starts.

TABLE 8

Compositions described in Example 8 with 600 g expanded lightweight clay aggregate added to each mix

| Mix | Water g. | W/ (FA + PC) | Potassium Citrate g. | Class C Fly ash g. | Portland Cement g. | Set time min | Density pcf | Compressive strength Psi | |
|---|---|---|---|---|---|---|---|---|---|
| | | | | | | | | 3-hr | 14 d |
| 1 | 280 | 0.26 | 37.8 | 540 | 540 | 27 | 118.8 | 3382 | 7890 |
| 2 | 280 | 0.26 | 37.8 | 685 | 395 | 19 | 119.0 | 4144 | 9214 |
| 3 | 280 | 0.26 | 37.8 | 955 | 125 | 7.5 | 117.0 | 4116 | 10884 |
| 4 | 324 | 0.30 | 37.8 | 395 | 685 | 37 | 120.0 | 2236 | 10393 |
| 5 | 324 | 0.30 | 37.8 | 540 | 540 | 26 | 117.3 | 3213 | 9191 |
| 6 | 324 | 0.30 | 37.8 | 685 | 395 | 18 | 116.4 | 3100 | 8085 |
| 7 | 324 | 0.30 | 37.8 | 955 | 125 | 10.5 | 116.0 | 3241 | 9243 |

Example 9

Details of the formulations used in this example are included in TABLE 9. Two sets of results are included here. For the first four mixes only fly ash was added without any portland cement and the water to fly ash ratio was varied from 0.26 to 0.17 with the potassium citrate dosage kept constant at 4% (by weight fly ash). The results for the compressive strengths indicate reducing the water content significantly increased the 3-hour compressive strengths.

The second set of results includes mixes 5-7 which contain a blend of fly ash and portland cement. For mixes 5 through 7 the compressive strength decreases as the amount of fly ash is The increase in temperature which accompanies the mixes with lower water content correlates with higher compressive strengths. By contrast the increase in temperature obtained with increased portland cement did not translate into increased compressive strengths. Therefore, a different mechanism was responsible for the strength development of mixes with blends of fly ash and portland cement compared to mixes containing only fly ash.

TABLE 9

Compositions of example 9 containing 600 g. expanded clay lightweight aggregate and 43.2 g. potassium citrate

| Mix | Water grams | W/(FA + PC) | Class C Fly ash grams | Portland Cement grams | Set time min. | Density pcf | Compressive Strength psi | |
|---|---|---|---|---|---|---|---|---|
| | | | | | | | 3-hr | 14 d |
| 1 | 280 | 0.26 | 1080 | 0 | 7.1 | 118.7 | 3181 | 7282 |
| 2 | 248.4 | 0.23 | 1080 | 0 | 6.5 | 115.8 | 3617 | 9322 |
| 3 | 216 | 0.20 | 1080 | 0 | 6.3 | 117.0 | 5924 | 10091 |
| 4 | 183.6 | 0.17 | 1080 | 0 | 6.0 | 119.4 | 7191 | 12702 |
| 5 | 216 | 0.20 | 955 | 125 | 4.0 | 118.7 | 5712 | 12732 |
| 6 | 216 | 0.20 | 820 | 260 | 4.5 | 119.3 | 5247 | 11277 |
| 7 | 216 | 0.20 | 685 | 395 | 4.5 | 118.9 | 4379 | 9450 |

Example 10

Details of the formulations used in this example are included in TABLE 10. For these mixes only fly ash was added without any portland cement. The potassium citrate dosage was varied between 2% and 6% (by weight fly ash) and the water to fly ash ratio was kept constant at 0.20. The results in TABLE 10 indicate in general the compressive strengths of the fly ash mixes increased as the potassium citrate dosage increased. The increase in strength at 3-hours appears to level off at 5 wt. %, with the mix with 5 wt. % potassium achieving comparable 3-hr strength to the mix with 6 wt. % potassium citrate. The 14 day compressive strength appears to peak at about 3.0-4.0 wt. %.

TABLE 10

Compositions of example 10 containing 600 g. expanded lightweight clay aggregate and no portland cement

| Mix | Water grams | W/(FA) | Potassium citrate grams | wt % | Class C Fly ash grams | Set time min. | Density pcf | Compressive strength Psi 3-hr | 14 d |
|---|---|---|---|---|---|---|---|---|---|
| 1 | 216 | 0.20 | 21.6 | 2.0 | 1080 | 10.0 | 120.0 | 2430 | 10284 |
| 2 | 216 | 0.20 | 32.4 | 3.0 | 1080 | 7.0 | 121.1 | 4260 | 11872 |
| 3 | 216 | 0.20 | 43.2 | 4.0 | 1080 | 6.5 | 120.8 | 5111 | 11789 |
| 4 | 216 | 0.20 | 54.0 | 5.0 | 1080 | 5.0 | 119.7 | 5692 | 9857 |
| 5 | 216 | 0.20 | 64.8 | 6.0 | 1080 | 5.5 | 117.5 | 5659 | 10621 |

Figure 9:
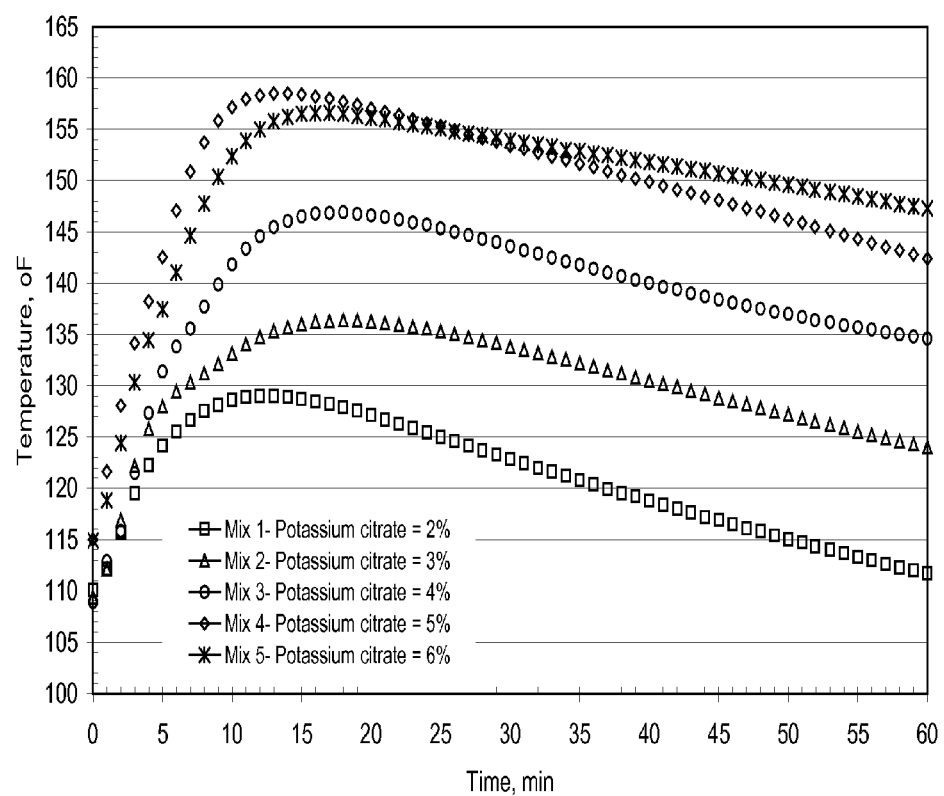
FIG. 9 is a graph of the results of Example 10 mixes with various dosages of potassium citrate using only fly ash without portland cement and shows adding potassium citrate significantly increases the rate of temperature rise of fly ash based mixes.

FIG. 9 shows the temperature rise for mixes with various dosages of potassium citrate using only fly ash without portland cement. This data shows adding potassium citrate significantly increases the rate of temperature rise of fly ash based mixes. However, the maximum temperatures achieved are relatively lower than mixes containing portland cement discussed in previous examples Although we have described the preferred embodiments for implementing our invention, it will be understood by those skilled in the art to which this disclosure is directed that modifications and additions may be made to our invention without departing from its spirit and scope.

The invention claimed is:

1. A composition for preparing a lightweight cement board having increased compressive strength and water durability comprising a mixture of:
water,
cementitious reactive powder comprising:
 75 to 100 wt. % fly ash, wherein at least 50% of the fly ash is class C fly ash,
 up to 25 wt. % of a cementitious material selected from the group consisting of hydraulic cement, calcium sulfate dihydrate, a pozzolanic non-fly ash mineral additive, a mixture of calcium sulfate dihydrate and a pozzolanic non-fly ash mineral additive, and a mixture of hydraulic cement and a pozzolanic non-fly ash mineral additive
an alkali metal salt of citric acid as a set accelerator,
up to 1.0 part of a secondary inorganic set accelerator, and
lightweight aggregate selected from the group consisting of blast furnace slag, volcanic tuff, pumice, expanded clay, shale, and perlite, hollow ceramic spheres, hollow plastic spheres, expanded plastic beads and mixtures thereof;
wherein the weight ratio of water to cementitious reactive powder is about 0.17 to 0.35:1.0,
wherein the formed mixture has a compressive strength measured after 3 hours of between 2000 psi to 5000 psi (13.8 MPa to 34.5 MPa); and
wherein the cementitious material is settable within 4 to 6 minutes of mixing of the composition without addition of a setting retarder.

2. The composition of claim 1, wherein the cementitious reactive powder comprises 88.5 to 100% fly ash, no hydraulic cement, up to 11.5% pozzolan non-fly ash mineral additive, and no calcium sulfate dihydrate, and the mixture does not contain either lithium carbonate or potassium carbonate.

3. The composition of claim 1, wherein the cementitious reactive powder comprises 88.5 to 100 wt % class C fly ash and the cementitious material comprises calcium sulfate dihydrate and 1-200 parts lightweight aggregate per 100 parts cementitious reactive powder.

4. The composition of claim 1, wherein the cementitious reactive powder contains 10 to 40 wt. % lime.

5. The composition of claim 1, the mixture comprising on a dry basis per 100 parts cementitious reactive powder:
 1.5 to 6 parts alkali metal salt of citric acid;
 1-200 parts lightweight aggregate;
 less than 25 parts pozzolanic non-fly ash mineral additive;
 0.01 to 1 parts air-entraining agent;
 less than 1 part secondary inorganic set accelerator in addition to the alkali metal salt of citric acid;
 2 parts maximum superplasticizer;
 1 part maximum shrinkage control agents
wherein the cementitious reactive powder comprises 88.5 to 100 parts fly ash, wherein at least 88.5 wt. % of the cementitious reactive powder is Type C fly ash, and the calcium sulfate comprises calcium sulfate dihydrate and 1-200 parts lightweight aggregate per 100 parts cementitious reactive powder.

6. The composition of claim 1, the mixture comprising on a dry basis per 100 parts cementitious reactive powder:
 2 to 4 parts alkali metal salt of citric acid;
 2-125 parts lightweight aggregate;
 less than 11.5 parts pozzolanic non-fly ash mineral additive;
 0 parts set retarder;
 less than 0.25 part inorganic set accelerator in addition to the alkali metal salt of citric acid;
 0.1 to 1 parts superplasticizer;
 wherein the cementitious reactive powder comprises 88.5 to 100 parts fly ash, wherein at least 88.5 wt. % of the cementitious reactive powder is Type C fly ash, and the cementitious material comprises calcium sulfate dihydrate and 1-200 parts lightweight aggregate per 100 parts cementitious reactive powder;
 wherein the alkali metal salt of citric acid is selected from the group consisting of potassium citrates, sodium citrates, and mixture thereof.

7. The composition of claim 1, wherein the alkali metal salt of citric acid is selected from the group consisting of potassium citrates, sodium citrates, and mixtures thereof, and the citrate(s) is in an amount of about 1.5 to 6 wt. % based on the weight of the cementitious reactive powder.

8. The composition of claim 1, wherein the alkali metal salt of citric acid is the potassium citrate and the potassium citrate is in an amount of about 1.5 to 4 wt. % based on the weight of the cementitious reactive powder.

9. The composition of claim 1, wherein the alkali metal salt of citric acid is potassium citrate and the potassium citrate is in an amount of about 2 to 3.5 wt. % based on the weight of the cementitious reactive powder.

10. The composition of claim 1, wherein the cementitious reactive powder further comprises a pozzolanic non-fly-ash mineral additive which is selected from pumice, perlite, diatomaceous earth, tuff, trass, rice husk, metakaolin, ground granulated blast furnace slag, and mixtures thereof.

11. The composition of claim 1, wherein the cementitious reactive powder further comprises silica fume as a pozzolanic non-fly ash mineral additive.

12. The composition of claim 1, wherein the cementitious reactive powder and water are present in a weight ratio of about 0.20-0.23:1 part by weight water to reactive powder.

13. The composition of claim 1, the mixture further comprising at least one member of the group consisting of air-entraining agent, and secondary inorganic set accelerator.

14. The composition of claim 1, wherein the mixture is settable within 4 to 6 minutes after forming the mixture.

15. A composition for preparing a lightweight cement board comprising a mixture of:
water,
cementitious reactive powder solids comprising:
75 to 100 wt. % fly ash, wherein at least 50% of the fly ash is class C fly ash,
up to 25 wt. % of a cementitious material selected from the group consisting of hydraulic cement, calcium sulfate dihydrate, calcium sulfate hemihydrate and calcium sulfate anhydride,
wherein the cementitious material does not contain a mixture of hydraulic cement and calcium sulfate dihydrate, a mixture of hydraulic cement and calcium sulfate hemihydrate, or a mixture of hydraulic cement and calcium sulfate anhydrite;
an alkali metal salt of citric acid as a set accelerator;
lightweight aggregate selected from the group consisting of blast furnace slag, volcanic tuff, pumice, expanded clay, shale, and perlite, hollow ceramic spheres, hollow plastic spheres, expanded plastic beads and mixtures thereof;
wherein the ratio of water to cementitious reactive powder solids in the mixture is about 0.17 to 0.35:1, and
wherein the formed mixture has a compressive strength measured after 3 hours of between 2000 psi to 5000 psi (13.8 MPa to 34.5 MPa).

16. The composition of claim 15, wherein the mixture comprises about 1.5 to 6.0 wt. %, based upon the weight of cementitious powder, of an alkali metal salt of citric acid selected from the group consisting of sodium citrates, potassium citrates and mixtures thereof and the cementitious reactive powder comprises 88.5 to 100 wt % class C fly ash.

17. The composition of claim 15, wherein the mixture comprises about 1.5 to 4.0 wt. %, based upon the weight of cementitious powder, of an alkali metal salt of citric acid selected from the group consisting of sodium citrates, potassium citrates and mixtures thereof.

18. The composition of claim 15, wherein the mixture comprises about 2.0 to 3.5 wt. % sodium citrate or potassium citrate based on the weight of the cementitious reactive powder.

19. The composition of claim 15, wherein the cementitious reactive powder is 88.5 to 100 wt % class C fly ash, and the mixture consists of on a dry basis per 100 parts cementitious reactive powder:
about 1.5 to 6 parts alkali metal salt of citric acid set accelerator;
1-200 parts lightweight aggregate;
less than 25 parts non-fly ash mineral additive;
0.01 to 1 parts air-entraining agent;
less than 1 part of a secondary inorganic set accelerator;
2 parts maximum superplasticizer;
1 part maximum shrinkage control agents,
wherein the composition has no hydraulic cement and no calcium sulfate, and wherein the mixture does not include lithium carbonate or potassium carbonate.

20. A composition for preparing a lightweight cement board having increased compressive strength and water durability comprising a mixture of:
water,
cementitious reactive powder comprising 88.5 to 100 wt. % class C fly ash,
and the mixture consists of on a dry basis per 100 parts cementitious reactive powder:
alkali metal salt of citric acid as a set accelerator;
1-200 parts lightweight aggregate selected from at least one member of the group consisting of expanded forms of blast furnace slag, volcanic tuff, pumice, expanded clay, shale, and perlite, hollow ceramic spheres, hollow plastic spheres, and expanded plastic beads and mixtures thereof;
0.01 to 1 parts air-entraining agent;
2 parts maximum superplasticizer;
1 part maximum shrinkage control agents,
wherein the mixture has no hydraulic cement and no calcium sulfate dihydrate, no calcium sulfate hemihydrate, no calcium sulfate anhydrite and no pozzolan non-fly ash mineral additive,
wherein the mixture does not contain lithium carbonate or potassium carbonate,
wherein the weight ratio of water to cementitious reactive powder is about 0.17 to 0.35:1.0,
wherein the formed mixture has a compressive strength measured after 3 hours of between 2000 psi to 5000 psi (13.8 MPa to 34.5 MPa); and
wherein the cementitious material is settable within 4 to 6 minutes of mixing of the composition.

* * * * *